United States Patent
Yamazaki

(10) Patent No.: US 11,548,214 B2
(45) Date of Patent: Jan. 10, 2023

(54) THREE-DIMENSIONAL SHAPED OBJECT MANUFACTURING METHOD AND THREE-DIMENSIONAL SHAPING DEVICE

(71) Applicant: SEIKO EPSON CORPORATION, Tokyo (JP)

(72) Inventor: Satoshi Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 76 days.

(21) Appl. No.: 17/171,203

(22) Filed: Feb. 9, 2021

(65) Prior Publication Data
US 2021/0245426 A1 Aug. 12, 2021

(30) Foreign Application Priority Data
Feb. 12, 2020 (JP) .............................. JP2020-021404

(51) Int. Cl.
*B29C 64/124* (2017.01)
*B29C 64/209* (2017.01)
(Continued)

(52) U.S. Cl.
CPC .......... *B29C 64/124* (2017.08); *B29C 64/209* (2017.08); *B29C 64/232* (2017.08);
(Continued)

(58) Field of Classification Search
CPC ... B29C 64/124; B29C 64/314; B29C 64/232; B29C 64/245; B29C 64/209;
(Continued)

(56) References Cited

U.S. PATENT DOCUMENTS

2007/0179657 A1* 8/2007 Holzwarth ............ B29C 64/106
  700/187
2017/0008230 A1 1/2017 Yuyama

FOREIGN PATENT DOCUMENTS

JP 2018176597 A * 11/2018
JP 2019-025759 2/2019
WO 2015-129733 9/2015

OTHER PUBLICATIONS

Ogiwara (JP2018176597A), published 2018, machine translation. (Year: 2018).*

* cited by examiner

*Primary Examiner* — Joseph S Del Sole
*Assistant Examiner* — Lawrence D. Hohenbrink, Jr.
(74) *Attorney, Agent, or Firm* — Workman Nydegger

(57) ABSTRACT

A three-dimensional shaped object manufacturing method for shaping a three-dimensional shaped object. The three-dimensional shaped object manufacturing method includes a first step of shaping a first partial shaped object corresponding to a first partial path and a second partial shaped object corresponding to a second partial path in accordance with shaping data including path data and discharge amount data; a second step of measuring a first gap indicating a gap between the first partial shaped object and the second partial shaped object; and a third step of executing an adjustment processing of adjusting, based on a difference between the first gap and a second gap determined based on the shaping data and corresponding to the first gap, a discharge amount in a third partial path which is one of the plurality of paths and along which the discharge unit moves after the first partial path and the second partial path.

12 Claims, 13 Drawing Sheets

(51) Int. Cl.
*B29C 64/232* (2017.01)
*B29C 64/245* (2017.01)
*B33Y 50/02* (2015.01)
*B29C 64/314* (2017.01)
*B33Y 40/00* (2020.01)
*B33Y 10/00* (2015.01)
*B33Y 30/00* (2015.01)
*B29C 64/393* (2017.01)

(52) U.S. Cl.
CPC .......... *B29C 64/245* (2017.08); *B29C 64/314* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ....... B29C 64/393; B33Y 10/00; B33Y 30/00; B33Y 40/00; B33Y 50/02
USPC ...................................................... 264/40.1
See application file for complete search history.

THREE-DIMENSIONAL SHAPED OBJECT MANUFACTURING METHOD AND THREE-DIMENSIONAL SHAPING DEVICE

The present application is based on, and claims priority from JP Application Serial Number 2020-021404, filed Feb. 12, 2020, the disclosure of which is hereby incorporated by reference herein in its entirety.

BACKGROUND

1. Technical Field

The present disclosure relates to a three-dimensional shaped object manufacturing method and a three-dimensional shaping device.

2. Related Art

Regarding a three-dimensional shaped object manufacturing method, for example, WO2015/129733 discloses a technique for shaping a three-dimensional shaped object by plasticizing a resin material with an in-line screw and discharging the plasticized resin material from a nozzle to stack layers.

In the three-dimensional shaped object manufacturing method disclosed in WO2015/129733, the resin material of an intended discharge amount may not be discharged due to a change in a shaping environment, a plasticizing state, or the like. When the resin material of an intended discharge amount cannot be discharged, for example, a gap may be generated in a shaped object and the shaping accuracy of the shaped object may be affected.

SUMMARY

According to a first aspect of the present disclosure, there is provided a three-dimensional shaped object manufacturing method for shaping a three-dimensional shaped object by discharging a shaping material from a discharge unit toward a stage. The three-dimensional shaped object manufacturing method for shaping the three-dimensional shaped object by discharging the shaping material from the discharge unit toward the stage includes a first step of shaping a first partial shaped object corresponding to a first partial path and a second partial shaped object corresponding to a second partial path in accordance with shaping data including path data and discharge amount data, the path data including a plurality of paths along which the discharge unit moves while discharging the shaping material and including the first partial path and the second partial path that are adjacent paths among the plurality of paths, the discharge amount data indicating a discharge amount of the shaping material in each of the paths; a second step of measuring a first gap indicating a gap between the first partial shaped object and the second partial shaped object; and a third step of executing an adjustment processing of adjusting, based on a difference between the first gap and a second gap determined based on the shaping data and corresponding to the first gap, a discharge amount in a third partial path which is one of the plurality of paths and along which the discharge unit moves after the first partial path and the second partial path.

According to a second aspect of the present disclosure, there is provided a three-dimensional shaping device. The three-dimensional shaping device includes a discharge unit configured to discharge a shaping material toward a stage, a moving mechanism configured to change a relative position between the discharge unit and the stage, a measurement unit configured to measure a gap between discharged shaping materials, and a control unit configured to control the discharge unit, the moving mechanism, and the measurement unit. The control unit is configured to shape a first partial shaped object corresponding to a first partial path and a second partial shaped object corresponding to a second partial path by controlling the discharge unit and the moving mechanism in accordance with shaping data including path data and discharge amount data, the path data including a plurality of paths along which the discharge unit moves while discharging the shaping material and including the first partial path and the second partial path that are adjacent paths among the plurality of paths, the discharge amount data indicating a discharge amount of the shaping material in each of the paths; measure a first gap indicating a gap between the first partial shaped object and the second partial shaped object by controlling the measurement unit; and execute an adjustment processing of adjusting, based on a difference between the first gap and a second gap determined based on the shaping data and corresponding to the first gap, a discharge amount in a third partial path which is one of the plurality of paths and along which the discharge unit moves after the first partial path and the second partial path.

DESCRIPTION OF EXEMPLARY EMBODIMENTS

A. First Embodiment

Figure 1:
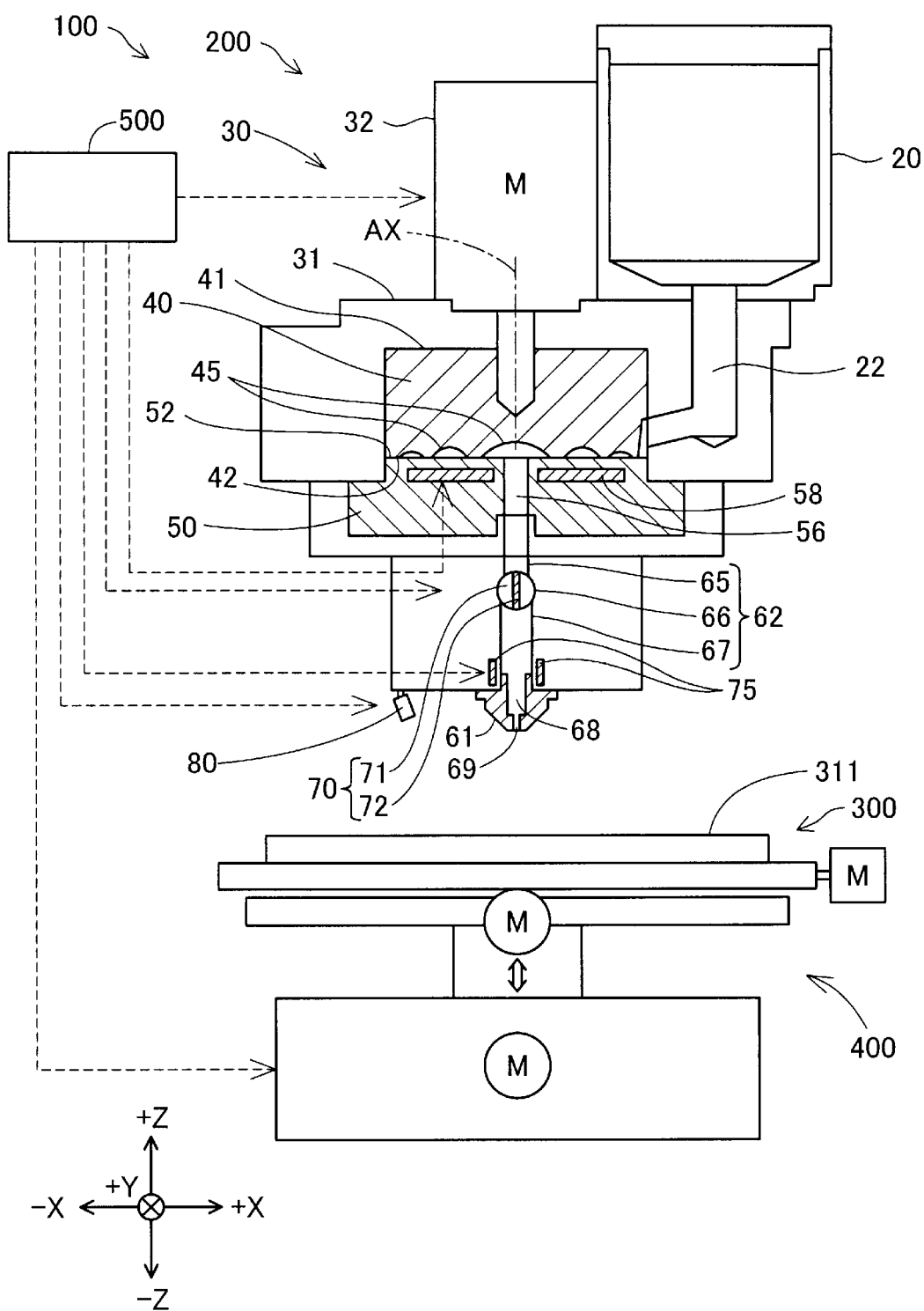
FIG. 1 is a diagram showing a schematic configuration of a three-dimensional shaping device according to a first embodiment.

FIG. 1 is a schematic diagram showing a configuration of a three-dimensional shaping device 100 according to the present embodiment. FIG. 1 shows arrows along X, Y, and Z directions that are orthogonal to one another. The X, Y, and Z directions are directions along an X axis, a Y axis, and a Z axis that are three spatial axes orthogonal to one another. Each direction includes both a direction along each of the X axis, the Y axis, and the Z axis and an opposite direction thereof. The X axis and the Y axis are axes along a horizontal plane and the Z axis is an axis along a vertical line. Other figures also appropriately show the arrows along the X, Y, and Z directions. The X, Y, and Z directions in FIG. 1 and the X, Y, and Z directions in other figures indicate the same directions. In the following description, when a direction is to be specified, "+" indicates a positive direction, "−" indicates a negative direction, and positive and negative symbols are used together to indicate directions.

The three-dimensional shaping device 100 according to the present embodiment includes a discharge unit 200, a stage 300, a moving mechanism 400, and a control unit 500. Under the control of the control unit 500, the three-dimensional shaping device 100 shapes a three-dimensional shaped object having a desired shape on a shaping surface 311 of the stage 300 by driving the moving mechanism 400 to change a relative position between the discharge unit 200 and the stage 300 while discharging a shaping material from the discharge unit 200 toward the stage 300. The shaping material may also be referred to as a molten material. A detailed configuration of the discharge unit 200 will be described later.

The moving mechanism 400 changes a relative position between the discharge unit 200 and the stage 300. In the present embodiment, the moving mechanism 400 changes a relative position between the discharge unit 200 and the stage 300 by moving the stage 300 relative to the discharge unit 200. A change in position of the discharge unit 200 relative to the stage 300 may also be simply referred to as a movement of the discharge unit 200. In the present embodiment, for example, a movement of the stage 300 in a +X direction can also be rephrased as a movement of the discharge unit 200 in a −X direction.

The moving mechanism 400 according to the present embodiment is implemented by a three-axis positioner that moves the stage 300 in three axial directions of the X, Y, and Z directions by drive forces of three motors. Each motor is driven under the control of the control unit 500. The moving mechanism 400 may not be configured to move the stage 300 and may be configured to move the discharge unit 200 without moving the stage 300. Alternatively, the moving mechanism 400 may be configured to move both the stage 300 and the discharge unit 200.

The control unit 500 is implemented by a computer including one or more processors, a main storage device, and an input and output interface through which a signal is received from outside or is output to the outside. In the present embodiment, the control unit 500 controls an operation of the discharge unit 200 and the moving mechanism 400 by the processor executing a program or a command read in the main storage device, so as to execute a shaping processing for shaping a three-dimensional shaped object. The operation includes changing a three-dimensional relative position between the discharge unit 200 and the stage 300. The control unit 500 may be implemented by a combination of a plurality of circuits instead of a computer.

The discharge unit 200 includes a material supply unit 20 that is a material supply source, a plasticizing unit 30 that melts a material supplied from the material supply unit 20 into a shaping material, a nozzle 61 that discharges the shaping material, a supply flow path 62 that communicates the plasticizing unit 30 and the nozzle 61, a discharge amount adjustment mechanism 70 that adjusts a flow rate of the shaping material discharged from the nozzle 61, and a measurement unit 80 that measures a gap between discharged shaping materials.

The material supply unit 20 accommodates a material in a state of pellets, powder, or the like. In the present embodiment, a resin formed in a pellet form is used as a material. The material supply unit 20 according to the present embodiment is implemented by a hopper. A supply path 22 that couples the material supply unit 20 and the plasticizing unit 30 is provided below the material supply unit 20. The material supply unit 20 supplies the material to the plasticizing unit 30 via the supply path 22. Details of the material will be described later.

The plasticizing unit 30 includes a screw case 31, a drive motor 32, a flat screw 40, and a barrel 50. The plasticizing unit 30 melts at least a part of a solid-state material supplied from the material supply unit 20, generates a paste shaping material having flowability, and supplies the shaping material to the nozzle 61. The term "melt" not only refers to that a thermoplastic material is heated to a temperature equal to or higher than a melting point and becomes a liquid, but also refers to "plasticizing" in which the thermoplastic material is softened and exhibits flowability by being heated to a temperature equal to or higher than a glass transition point.

The screw case 31 is a housing for accommodating the flat screw 40. The barrel 50 is fixed to a lower surface of the screw case 31, and the flat screw 40 is accommodated in a space surrounded by the screw case 31 and the barrel 50. On a surface facing the barrel 50, the flat screw 40 has a groove forming surface 42 on which a groove 45 is formed. A drive motor 32 is fixed to an upper surface of the screw case 31. A rotation shaft of the drive motor 32 is coupled to an upper surface 41 side of the flat screw 40. The drive motor 32 is driven under the control of the control unit 500.

The flat screw 40 has a substantially cylindrical shape whose height in a direction along a central axis RX is smaller than a diameter. The flat screw 40 is provided in the screw case 31 such that the central axis RX is parallel to the Z direction. At an opposite side of the flat screw 40 from an upper surface 41 in the direction along the central axis RX, the flat screw 40 has the groove forming surface 42 on which the groove 45 is formed. A specific configuration of the flat screw 40 at a groove forming surface 42 side will be described later. The flat screw 40 is rotated around the central axis RX in the screw case 31 by a torque generated by the drive motor 32. The drive motor 32 is driven under the control of the control unit 500.

The barrel 50 is provided below the flat screw 40. The barrel 50 has a screw facing surface 52 that faces the groove forming surface 42 of the flat screw 40. A communication hole 56 that communicates with the supply flow path 62 is provided in the barrel 50 along the central axis RX of the flat screw 40. A heater 58 is built in the barrel 50 at a position facing the grooves 45 of the flat screw 40. A temperature of the heater is controlled by the control unit 500. A specific configuration of the barrel 50 at a screw facing surface 52 side will be described later.

The nozzle 61 is fixed to a lower surface of the barrel 50. The supply flow path 62 is provided between the plasticizing unit 30 and the nozzle 61. The supply flow path 62 communicates the plasticizing unit 30 and the nozzle 61, and supplies the shaping material from the plasticizing unit 30 to the nozzle 61.

The supply flow path 62 includes a first supply port 65, an intersection hole 66, and a second supply port 67. The first supply port 65 and the second supply port 67 extend in a vertical direction. The intersection hole 66 extends in a horizontal direction intersecting the first supply port 65 and the second supply port 67. An upper end of the first supply port 65 is coupled to the communication hole 56 of the barrel 50, and a lower end of the first supply port 65 is coupled to the intersection hole 66. An upper end of the second supply port 67 is coupled to the intersection hole 66, and a lower end of the second supply port 67 is coupled to the nozzle 61. The discharge amount adjustment mechanism 70 to be described later is accommodated in the intersection hole 66. The shaping material supplied from the communication hole 56 of the barrel 50 to the first supply port 65 flows in an order of the intersection hole 66, the second supply port 67, and the nozzle 61.

The nozzle 61 is provided with a nozzle flow path 68 and a nozzle hole 69. The nozzle flow path 68 is a flow path provided in the nozzle 61. The nozzle flow path 68 is coupled to the second supply port 67. The nozzle hole 69 is a portion where a cross section of a flow path provided at an end portion of the nozzle flow path 68 at a side where the nozzle flow path 68 communicates with the atmosphere is reduced. The shaping material supplied from the second supply port 67 to the nozzle flow path 68 is discharged from the nozzle hole 69. In the present embodiment, an opening shape of the nozzle hole 69 is circular. The opening shape of the nozzle hole 69 is not limited to circular, and may be a quadrangle, a polygon other than a quadrangle, or the like.

In the present embodiment, a nozzle heater 75 is provided around the nozzle flow path 68. The nozzle heater 75 heats the nozzle 61 and the shaping material inside the nozzle flow path 68 under the control of the control unit 500. The control unit 500 controls an output of the nozzle heater 75 to adjust the flowability of the shaping material in the nozzle flow path 68. The control unit 500 controls the output of the nozzle heater 75 to adjust the flowability of the shaping material in the nozzle flow path 68, so that an amount of the shaping material discharged from the nozzle hole 69 or the like can be adjusted.

The discharge amount adjustment mechanism 70 is provided in the supply flow path 62, and adjusts an amount of the shaping material discharged from the nozzle 61. An amount of the shaping material discharged from the nozzle 61 per unit movement amount may be referred to as a discharge amount. The discharge amount adjustment mechanism 70 in the present embodiment is implemented by a butterfly valve. The discharge amount adjustment mechanism 70 includes a drive shaft 71 that is a shaft member, and a plate-shaped valve body 72 that is rotated accompanying with rotation of the drive shaft 71. The drive shaft 71 is inserted into the intersection hole 66 such that a direction along a central axis of the drive shaft 71 intersects a flow direction of the shaping material in the supply flow path 62.

The discharge amount adjustment mechanism 70 functions as a flow rate adjustment mechanism that adjusts a flow rate of the shaping material flowing in the supply flow path 62. Specifically, the discharge amount adjustment mechanism 70 adjusts the flow rate of the shaping material flowing in the supply flow path 62 by changing a rotation angle of the valve body 72. A discharge amount is adjusted by adjusting the flow rate of the shaping material flowing in the supply flow path 62. Increasing the discharge amount by controlling the discharge amount adjustment mechanism 70 may be referred to as opening of the discharge amount adjustment mechanism 70. Reducing the discharge amount by controlling the discharge amount adjustment mechanism 70 may be referred to as closing of the discharge amount adjustment mechanism 70. A degree of the rotation of the valve body 72 may be referred to as an opening degree. When a plate-shaped surface of the valve body 72 is perpendicular to a direction in which the shaping material flows in the supply flow path 62 by rotating the drive shaft 71, the opening degree is 0, the plasticizing unit 30 and the nozzle 61 do not communicate with each other, and discharging of the shaping material from the nozzle 61 is stopped. When the valve body 72 is rotated from this state, the opening degree is larger than 0, the plasticizing unit 30 and the nozzle 61 can communicate with each other, and the shaping material can be discharged. When the plate-shaped surface of the valve body 72 is parallel to the direction in which the shaping material flows in the supply flow path 62, the opening degree is 100. In this manner, the discharge amount adjustment mechanism 70 also controls discharge starting and discharge stopping of the shaping material from the nozzle 61.

The measurement unit 80 according to the present embodiment includes a laser oscillating unit and a laser light receiving unit. The measurement unit 80 measures a gap between shaping materials by emitting a laser toward the stage 300 and receiving the emitted laser. The measurement unit 80 is controlled by the control unit 500. Details of a measurement of the gap executed by the measurement unit 80 will be described later.

Figure 2:
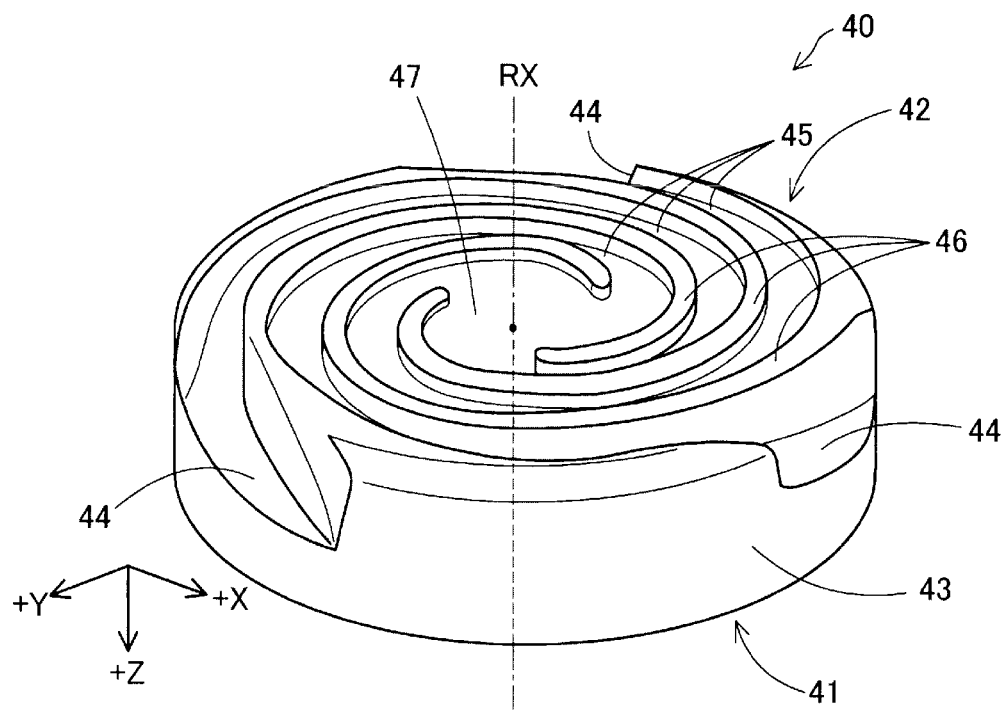
FIG. 2 is a schematic perspective view showing a configuration of a flat screw at a groove forming surface side.

FIG. 2 is a schematic perspective view showing a configuration of the flat screw 40 at the groove forming surface 42 side. In FIG. 2, a position of the central axis RX of the flat screw 40 is indicated by a dash-dot line. As described with reference to FIG. 1, the grooves 45 are provided on the groove forming surface 42.

A central portion 47 of the groove forming surface 42 of the flat screw 40 is formed into a recess to which one end of the groove 45 is coupled. The central portion 47 faces the communication hole 56 of the barrel 50 shown in FIG. 1. The central portion 47 intersects the central axis RX.

The groove 45 of the flat screw 40 forms a so-called scroll groove. The groove 45 extends in a vortex shape from the central portion 47 in a manner of drawing arcs toward an outer periphery of the flat screw 40. The groove 45 may be configured to extend in an involute curve shape or a spiral shape. The groove forming surface 42 is provided with a ridge portion 46 that constitutes a side wall portion of the groove and extends along each groove 45. The groove 45 is continuous up to a material introduction port 44 formed on a side surface 43 of the flat screw 40. The material introduction port 44 is a portion for receiving a material supplied via the supply path 22 of the material supply unit 20.

FIG. 2 shows an example of the flat screw 40 including three grooves 45 and three ridge portions 46. The number of the grooves 45 and the ridge portions 46 provided in the flat screw 40 is not limited to three. The flat screw 40 may be provided with only one groove 45, or may be provided with two or more grooves 45. The number of the ridge portions 46 may be any number corresponding to the number of the groove portions 45.

FIG. 2 shows an example of the flat screw 40 in which three material introduction ports 44 are formed. The number of the material introduction ports 44 provided in the flat screw 40 is not limited to three. The flat screw 40 may be provided with only one material introduction port 44, or may be provided with two or more material introduction ports 44.

Figure 3:
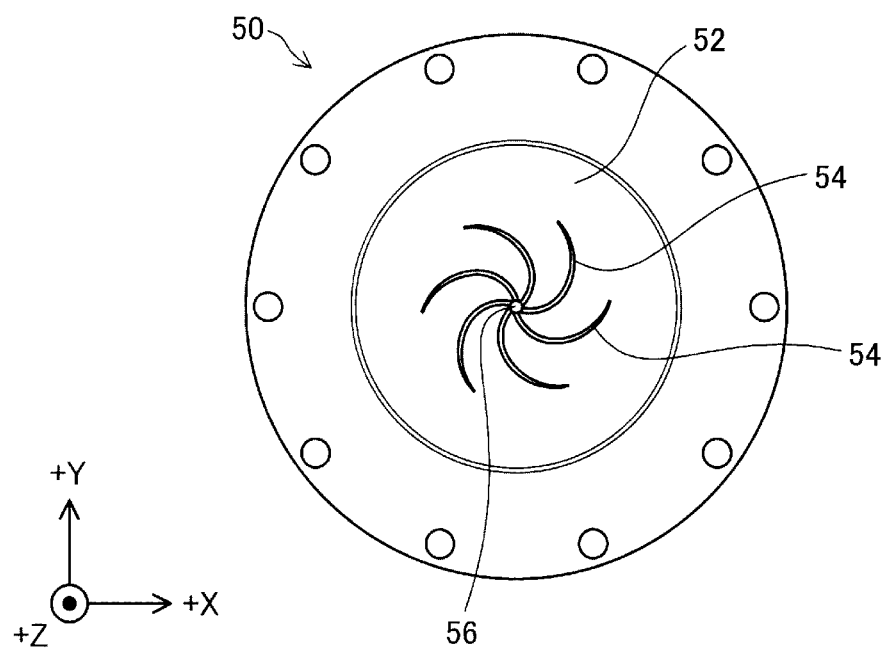
FIG. 3 is a top view showing a configuration of a barrel at a screw facing surface side.

FIG. 3 is a top view showing a configuration of the barrel 50 at the screw facing surface 52 side. As described above, the communication hole 56 communicating with the nozzle 61 is formed at the center of the screw facing surface 52. A plurality of guide grooves 54 are formed around the communication hole 56 on the screw facing surface 52. One end of each guide groove 54 is coupled to the communication hole 56, and extends in a vortex shape from the communication hole 56 toward an outer periphery of the screw facing surface 52. Each of the guide grooves 54 has a function of guiding the shaping material to the communication hole 56. The guide grooves 54 are preferably formed in the barrel 50 in order to efficiently guide the shaping material to arrive the communication hole 56, but the guide grooves 54 may not be formed in the barrel 50.

Figure 4:
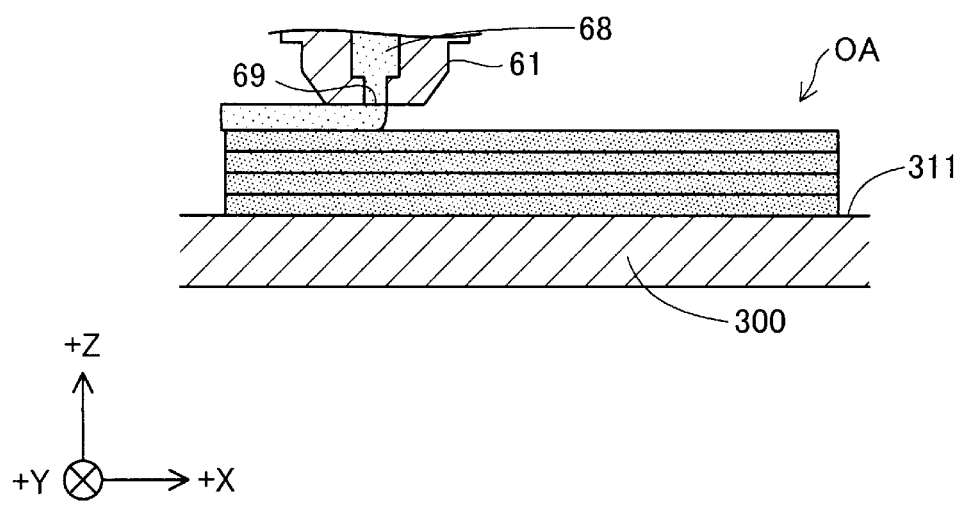
FIG. 4 is a schematic diagram showing a state of shaping a three-dimensional shaped object.

FIG. 4 is a schematic diagram showing a state of shaping a three-dimensional shaped object OA in the three-dimensional shaping device 100. In the three-dimensional shaping device 100, as described above, the plasticizing unit 30 melts the solid-state material supplied to the groove 45 of the flat screw 40 that is being rotated, and generates the shaping material. The control unit 500 discharges the shaping material from the discharge unit 200 toward the shaping surface 311 while moving the discharge unit 200. Specifically, the control unit 500 discharges the shaping material from the nozzle 61 while moving the nozzle 61 in a direction along the shaping surface 311 with a distance between the shaping surface 311 and the nozzle 61 maintained as it is. The shaping material discharged from the nozzle 61 is continuously deposited in a moving direction of the nozzle 61. Accordingly, a shaping portion extending linearly along a movement path of the nozzle 61 is shaped.

The control unit 500 repeats discharging of the shaping material from the nozzle 61 to form layers. After one layer is formed, the control unit 500 moves the nozzle 61 in the Z direction. Thereafter, a layer is further stacked on previously formed layers to shape a three-dimensional shaped object. FIG. 4 shows a state in which a fifth layer is in the middle of being shaped on four previously formed layers.

Figure 5:
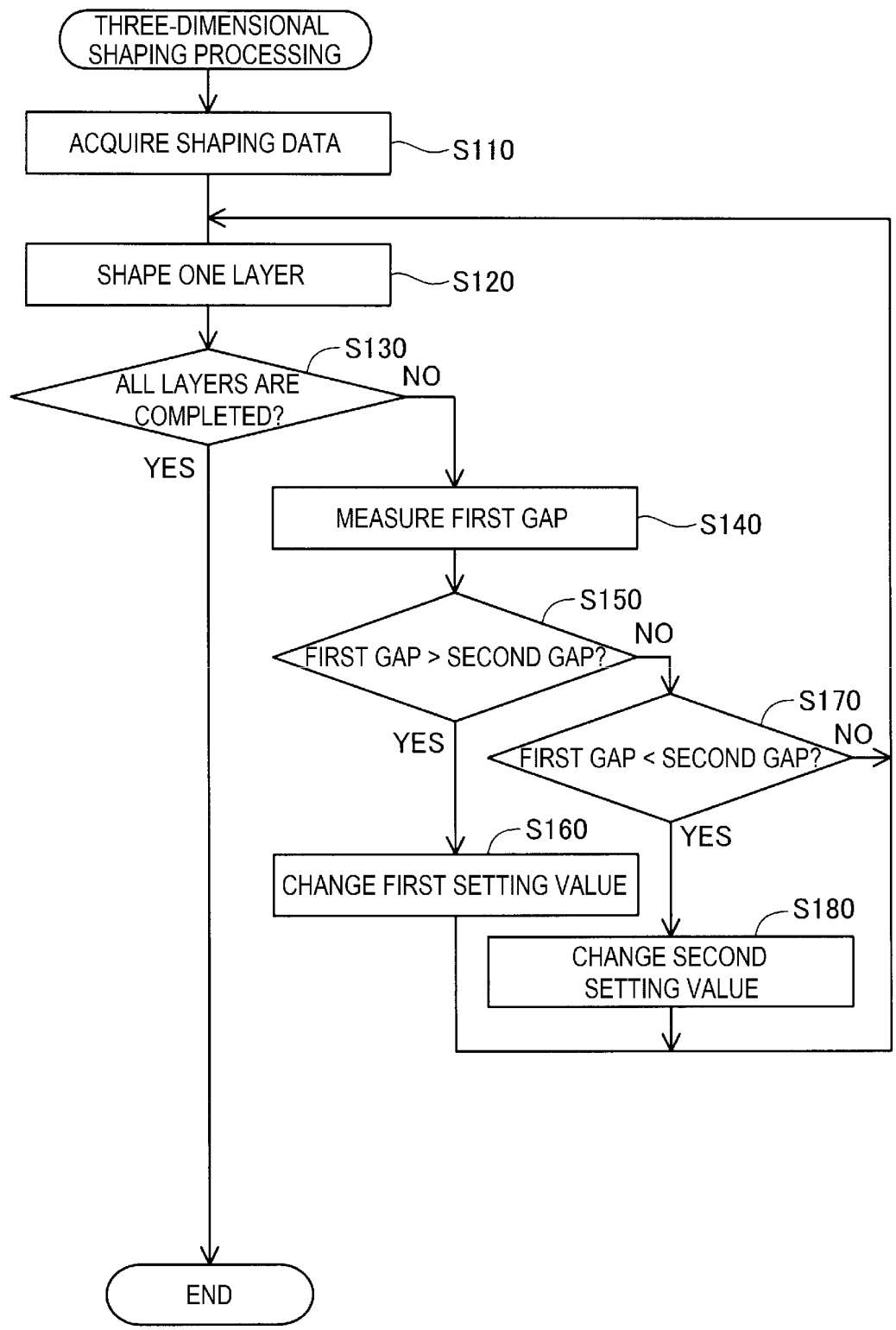
FIG. 5 is a flowchart showing an example of a three-dimensional shaped object manufacturing method according to the first embodiment.

FIG. 5 is a flowchart showing an example of a three-dimensional shaped object OA manufacturing method according to the first embodiment. When a user performs a predetermined start operation on an operation panel provided in the three-dimensional shaping device 100 or a computer coupled to the three-dimensional shaping device 100, the control unit 500 executes a shaping processing. The three-dimensional shaping device 100 starts to manufacture the three-dimensional shaped object OA by executing the shaping processing. In the shaping processing, the control unit 500 appropriately controls the discharge unit 200 and the moving mechanism 400 in accordance with shaping data to be described later, and shapes the three-dimensional shaped object OA by stacking layers of the shaping material on the shaping surface 311.

In step S110, the control unit 500 acquires the shaping data. The shaping data includes path data and discharge amount data. The path data includes a plurality of paths along which the discharge unit 200 moves while discharging the shaping material. A path refers to a path along which the discharge unit moves while discharging the shaping material. The discharge amount data is data indicating a discharge amount of the shaping material in each path. As described above, a movement of the discharge unit 200 indicates a change in a relative position of the discharge unit 200 with respect to the stage 300. Therefore, the path may indicate a change in the relative position of the discharge unit 200 with respect to the stage 300 when the discharge unit 200 discharges the shaping material.

The shaping data is created by, for example, slicer software installed in a computer coupled to the three-dimensional shaping device 100. The slicer software reads shape data indicating a shape of the three-dimensional shaped object OA created using three-dimensional CAD software, three-dimensional CG software, or the like, divides the shape of the three-dimensional shaped object OA into layers each having a predetermined thickness, and creates shaping data for each layer. The shape data read by the slicer software uses data in an STL format, an AMF format, or the like. The shaping data created by the slicer software is indicated by a G code, an M code, or the like. The control unit 500 acquires the shaping data from the computer coupled to the three-dimensional shaping device 100 or a recording medium such as a USB memory. The control unit 500 may acquire the shaping data by, for example, generating shaping data for each layer by the control unit 500 based on the shape data.

Figure 6:
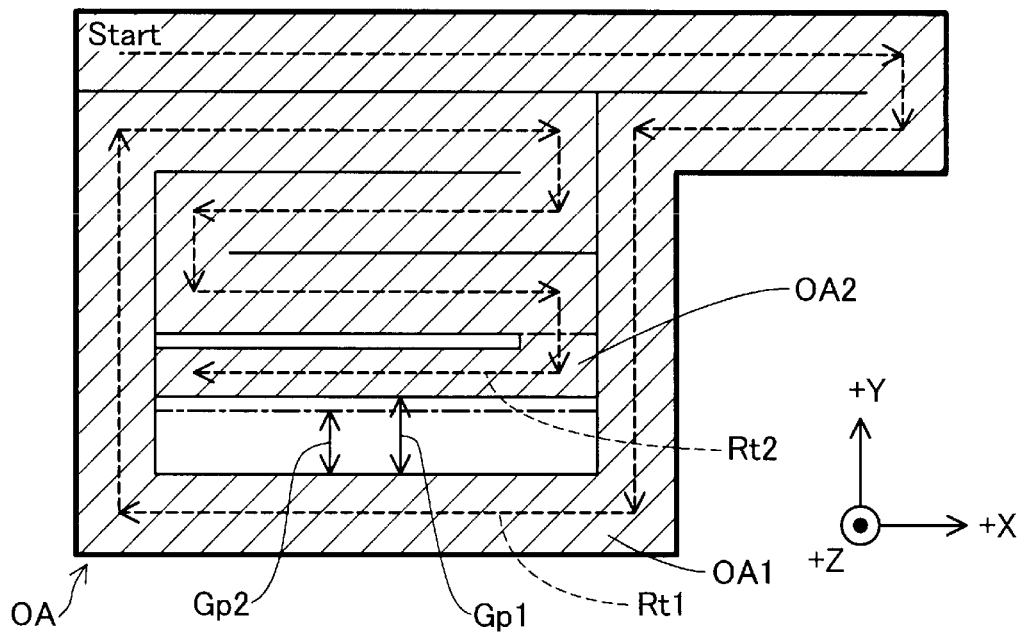
FIG. 6 is a diagram showing an example of a planar shape of one layer of the three-dimensional shaped object manufactured according to the first embodiment.

FIG. 6 is a diagram showing an example of a planar shape of one layer of the three-dimensional shaped object OA manufactured according to the present embodiment. FIG. 6 shows a state of one finished layer as viewed from a +Z direction. In FIG. 6, each path for shaping one layer is indicated by a broken line. In FIG. 6, the shaping material discharged along each path is hatched. As shown in FIG. 6, the path data in the present embodiment includes a first partial path Rt1 and a second partial path Rt2. The first partial path Rt1 and the second partial path Rt2 are paths adjacent to each other. An "adjacent" state refers to a state in which two parallel paths are not separated by another path.

In step S120 shown in FIG. 5, the control unit 500 shapes one layer of the three-dimensional shaped object OA. In step S120, the control unit 500 controls the discharge unit 200 and the moving mechanism 400 in accordance with the shaping data to shape one layer of the three-dimensional shaped object OA. The layer manufactured in step S120 includes a first partial shaped object OA1 corresponding to the first partial path Rt1 and a second partial shaped object OA2 corresponding to the second partial path Rt2. That is, in step S120, the first partial shaped object OA1 and the second partial shaped object OA2 are also shaped according to the shaping data. A step of shaping the first partial shaped object OA1 and the second partial shaped object OA2 in accordance with the shaping data as in step S120 may be referred to as a first step.

In step S130, the control unit 500 determines whether all layers are completed. When it is determined in step S130 that all layers are completed, the control unit 500 determines that the three-dimensional shaped object OA is completed, and ends the manufacture of the three-dimensional shaped object OA.

When it is determined in step S130 that not all layers are completed, the control unit 500 controls the measurement unit 80 to measure a first gap Gp1 in step S140. The first gap Gp1 refers to a gap between the first partial shaped object OA1 and the second partial shaped object OA2. A step of measuring the first gap Gp1 as in step S140 may be referred to as a second step.

In the present embodiment, an interval between the first partial shaped object OA1 and the second partial shaped object OA2 is measured as the first gap. The term "interval" refers to a distance between shaping materials discharged along adjacent paths. In the present embodiment, the measurement unit 80 executes scanning with a laser in a direction intersecting the first partial path Rt1 and the second partial path Rt2 in step S140. The measurement unit 80 detects a portion where the shaping material is not discharged in the first step between the first partial shaped object OA1 and the second partial shaped object OA2 based on time up to when an emitted laser is received, and measures a dimension of the portion as the first gap Gp1. In a portion where the first partial shaped object OA1 and the second partial shaped object OA2 are in contact with each other, an interval between the first partial shaped object OA1 and the second partial shaped object OA2 is measured as 0.

Relative to the first gap Gp1, a gap determined based on the shaping data is referred to as a second gap Gp2. The second gap Gp2 is determined by, for example, calculating a gap between a virtual shape of the first partial shaped object OA1 calculated based on a discharge amount in the first partial path Rt1 and a virtual shape of the second partial shaped object OA2 calculated based on a discharge amount in the second partial path Rt2.

In the present embodiment, an interval between the virtual shape of the first partial shaped object OA1 and the virtual shape of the second partial shaped object OA2 is calculated as the second gap Gp2. In FIG. 6, the virtual shape of the second partial shaped object OA2 is indicated by a dash-dot line. In FIG. 6, an actual shape of the first partial shaped object OA1 is the same as the virtual shape.

The control unit 500 executes an adjustment processing by executing the following steps S150 to S180. The adjustment processing is a processing of adjusting a discharge amount in a third partial path based on a difference between the first gap Gp1 and the second gap Gp2. The third partial path is a path along which the discharge unit 200 moves after the first partial path Rt1 and the second partial path Rt2. In the three-dimensional shaped object OA, a portion corresponding to the third partial path may be referred to as a third partial shaped object. In the present embodiment, the third partial path is a path for shaping a layer subsequent to layers shaped according to the first partial path Rt1 and the second partial path Rt2. In other embodiments, the third partial path may be, for example, a path for shaping a layer the same as a layer shaped according to the first partial path Rt1 or the second partial path Rt2. Alternatively, the third partial path may be, for example, a path for shaping a three-dimensional shaped object OA or another three-dimensional shaped object to be shaped subsequent to the three-dimensional shaped object OA. A step of executing the adjustment processing from step S150 to step S180 may be referred to as a third step.

In step S150, the control unit 500 determines whether the first gap Gp1 is larger than the second gap Gp2. When it is determined in step S150 that the first gap Gp1 is larger than the second gap Gp2, the control unit 500 executes a first setting value changing processing in step S160. The first setting value changing processing refers to a processing of changing a setting value related to discharging of the shaping material in the discharge unit 200 and increasing a discharge amount in the third partial path. That is, by executing step S150 and step S160, the control unit 500 executes a processing of increasing a discharge amount in the third partial path as the adjustment processing when the first gap Gp1 is larger than the second gap Gp2.

In the present embodiment, the control unit 500 changes at least one value of a rotation speed of the flat screw 40, a temperature of the plasticizing unit 30, and a temperature of the nozzle 61 as the setting value. In step S160, the control unit 500 executes at least one of increasing the rotation speed of the flat screw 40, increasing the temperature of the plasticizing unit 30, increasing the temperature of the nozzle 61, and the like as the first setting value changing processing. When the setting value is changed in step S160, in a step after the setting value is changed, the flowability of the shaping material in the discharge unit 200 is improved and a discharge amount of the shaping material discharged from the discharge unit 200 is increased.

In the example shown in FIG. 6, the control unit 500 determines in step S150 that the first gap Gp1 is larger than the second gap Gp2. Thereafter, in step S160, the control unit 500 executes the first setting value changing processing and increases the discharge amount in the third partial path. In FIG. 6, an amount of the shaping material actually discharged in the second partial path Rt2 is smaller than a discharge amount indicated by the discharge amount data. In this manner, when there is a difference between a discharge amount of actually discharged shaping material during shaping and a discharge amount indicated by the discharge amount data, a difference between the first gap Gp1 and the second gap Gp2 may occur. A change in the discharge amount of actually discharged shaping material is caused by, for example, a change in a shaping environment or a plasticizing state.

When it is determined in step S150 that the first gap Gp1 is not larger than the second gap Gp2, the control unit 500 determines in step S170 whether the first gap Gp1 is smaller than the second gap Gp2. When it is determined in step S170 that the first gap Gp1 is smaller than the second gap Gp2, the control unit 500 executes a second setting value changing processing in step S180. The second setting value changing processing refers to a processing of changing a setting value related to discharging of the shaping material in the discharge unit 200 and reducing the discharge amount in the third partial path. That is, by executing step S170 and step S180, the control unit 500 executes a processing of reducing the discharge amount in the third partial path as the adjustment processing when the first gap Gp1 is smaller than the second gap Gp2.

In step S180, the control unit 500 executes at least one of reducing a rotation speed of the flat screw 40, reducing a temperature of the plasticizing unit 30, reducing a temperature of the nozzle 61, and the like as the second setting value changing processing. When the setting value is changed in step S180, in steps after the setting value is changed, the flowability of the shaping material in the discharge unit 200 is reduced and a discharge amount of the shaping material discharged from the discharge unit 200 is reduced.

When it is determined in step S170 that the first gap Gp1 is not smaller than the second gap Gp2, the control unit 500 returns the processing to step S120 and shapes a subsequent layer. In step S120 to be executed again, the third partial shaped object corresponding to the third partial path is shaped. Step S170 is executed when it is determined that the first gap Gp1 is not larger than the second gap Gp2.

Therefore, when it is determined in step S170 that the first gap Gp1 is not smaller than the second gap Gp2, the first gap Gp1 and the second gap Gp2 are equal.

After step S160 is executed or after step S180 is executed, the control unit 500 returns the processing to step S120 and shapes a subsequent layer. In this case, the third partial shaped object corresponding to the third partial path is also shaped in step S120 to be executed again. When the setting value is changed in step S160 or step S180, the discharge unit 200 is controlled based on the changed setting value in step S120 to be executed again. For example, in the example shown in FIG. 6, the discharge amount in the third partial path is increased compared with a case in which the first setting value changing processing is not executed.

According to the three-dimensional shaped object OA manufacturing method in the present embodiment described above, the discharge amount in the third partial path is adjusted in the third step based on the difference between the first gap Gp1 and the second gap Gp2. Therefore, the possibility to discharge the shaping material of an intended discharge amount in the third partial path is increased, and the shaping accuracy of the three-dimensional shaped object OA is improved.

In the present embodiment, as the adjustment processing, the discharge amount in the third partial path is increased when the first gap Gp1 is larger than the second gap Gp2. Accordingly, the possibility that a discharge amount of the actually discharged shaping material in the third partial path is smaller than an intended discharge amount is reduced. Therefore, the possibility to discharge the shaping material of an intended discharge amount in the third partial path is increased, and the shaping accuracy of the three-dimensional shaped object OA is improved.

In the present embodiment, as the adjustment processing, the discharge amount in the third partial path is reduced when the first gap Gp1 is smaller than the second gap Gp2. Accordingly, the possibility that a discharge amount of the actually discharged shaping material in the third partial path is larger than an intended discharge amount is reduced. Therefore, the possibility to discharge the shaping material of an intended discharge amount in the third partial path is further increased, and the shaping accuracy of the three-dimensional shaped object OA is further improved.

In the present embodiment, the adjustment processing is executed by changing the setting value related to discharging of the shaping material in the discharge unit 200 in the third step. Therefore, by changing the setting value, the flowability of the shaping material in the discharge unit 200 can be adjusted and the discharge amount in the third partial path can be adjusted.

In the present embodiment, as the setting value, a value of at least one of the rotation speed of the flat screw 40, the temperature of the plasticizing unit 30, and the temperature of the nozzle 61 is changed in the third step. Therefore, when the discharge unit 200 includes the nozzle 61 and the plasticizing unit 30 having the flat screw 40, by a simple control, the flowability of the shaping material in the discharge unit 200 can be adjusted and the discharge amount in the third partial path can be adjusted.

Figure 7:
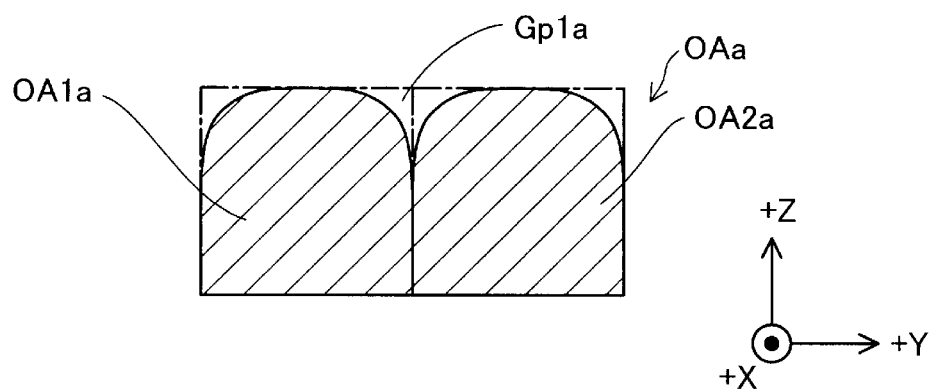
FIG. 7 is a diagram showing an example of a cross-sectional shape of apart of the three-dimensional shaped object manufactured according to the first embodiment.

FIG. 7 is a diagram showing an example of a cross-sectional shape of a part of a three-dimensional shaped object OAa manufactured according to the present embodiment. As shown in FIG. 7, a first gap Gp1a may be measured as a cross-sectional area of a space formed between a first partial shaped object OA1a and a second partial shaped object OA2a. In this case, for example, the measurement unit 80 measures heights between the first partial shaped object OA1a and the second partial shaped object OA2a, and integrates changes in the heights from the first partial shaped object OA1a to the second partial shaped object OA2a, thereby measuring the first gap Gp1a. In the example in FIG. 7, although an interval between the first partial shaped object OA1a and the second partial shaped object OA2a is 0, a space is formed between the first partial shaped object OA1a and the second partial shaped object OA2a. Therefore, the first gap Gp1a has a value exceeding 0.

As shown in FIG. 7, even when a dimension of a second gap between the first partial shaped object OA1a and the second partial shaped object OA2a is 0, the above-described manufacturing method shown in FIG. 5 can be applied. A case in which the dimension of the second gap is 0 refers to a case in which the three-dimensional shaped object is shaped without occurrence of the second gap, a case in which the control unit 500 calculates that the second gap does not occur, or the like. In FIG. 7, a virtual shape of the first partial shaped object OA1a and a virtual shape of the second partial shaped object OA2a are indicated by dash-dot lines. In FIG. 7, the second gap is not shown since the dimension of the second gap is 0. In FIG. 7, since the first gap Gp1a has a value exceeding 0, the first gap Gp1a is larger than the second gap. Therefore, in step S150 shown in FIG. 5, the control unit 500 determines that the first gap Gp1a is larger than the second gap, and executes the first setting value changing processing in step S160. Accordingly, the discharge amount in the third partial path is increased compared with a case in which the first setting value changing processing is not executed.

The first gap may be measured as, for example, a volume of the space formed between the first partial shaped object OA1a and the second partial shaped object OA2a. In this case, similar to the example shown in FIG. 7, the control unit 500 can measure the first gap by measuring a cross-sectional area of the space formed between the first partial shaped object and the second partial shaped object and integrating the measured cross-sectional area in a direction along the first partial path or the second partial path.

Here, a material of the three-dimensional shaped object OA used in the three-dimensional shaping device 100 described above will be described. The three-dimensional shaping device 100 can use various materials such as a thermoplastic material, a metal material, and a ceramic material as a main material to shape the three-dimensional shaped object. Here, the "main material" refers to a material serving as a main component for forming the shape of the three-dimensional shaped object OA, and refers to a material having a content of 50 wt % or more in the three-dimensional shaped object OA. The above-described shaping material includes a material obtained by melting the main material alone or a material obtained by melting the main material and a part of components contained in the main material into a paste form.

When a thermoplastic material is used as the main material, the shaping material is generated by plasticizing the thermoplastic material in the plasticizing unit 30.

Examples of the thermoplastic material may include the following thermoplastic resin materials.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyetheretherketone (PEEK), polycarbonate (PC), modified polyphenylene ether, polybutylene terephthalate, and polyethylene terephthalate; and engineering plastics such as polysulfone, polyether sulfone, polyphenylene sulfide, polyarylate, polyimide, polyamideimide, polyetherimide, and polyetheretherketone Additives such as a wax, a flame retardant, an antioxidant, and a heat stabilizer may be mixed into the thermoplastic material in addition to a pigment, a metal, a ceramic. In the plasticizing unit 30, the thermoplastic material is converted into a melted state by being plasticized by the rotation of the flat screw 40 and the heating of the heater 58. After the shaping material generated by melting the thermoplastic material is discharged from the nozzle 61, the shaping material is cured due to a reduction in temperature.

It is desirable that the thermoplastic material is ejected from the nozzle 61 in a state of being melted completely by being heated to a temperature equal to or higher than a glass transition point of the thermoplastic material. For example, when an ABS resin is used, it is desirable that a temperature is about 200° C. when the ABS resin is discharged from the nozzle 61.

In the three-dimensional shaping device 100, for example, the following metal material may be used as the main material instead of the above-described thermoplastic material. In this case, it is desirable that a component to be melted at the time of generating the shaping material is mixed into a powder material obtained by converting the following metal material into a powder, and then the mixture is charged into the plasticizing unit 30 as a material MR.
Example of Metal Material A single metal of magnesium (Mg), iron (Fe), cobalt (Co) or chromium (Cr), aluminum (Al), titanium (Ti), copper (Cu), and nickel (Ni), or an alloy containing one or more of these metals
Example of Alloy Maraging steel, stainless steel, cobalt chrome molybdenum, titanium alloy, nickel alloy, aluminum alloy, cobalt alloy, and cobalt chromium alloy In the three-dimensional shaping device 100, a ceramic material may be used as the main material instead of the above-described metal material. Examples of the ceramic material may include an oxide ceramic such as silicon dioxide, titanium dioxide, aluminum oxide, and zirconium oxide, and a non-oxide ceramic such as aluminum nitride. When the above-described metal material or ceramic material is used as the main material, the shaping material discharged onto the stage 300 may be cured by sintering.

A powder material of the metal material or the ceramic material to be charged into the material supply unit 20 as the material MR may be a mixed material obtained by mixing a plurality of types of powders of a single metal or an alloy and powders of a ceramic material. The powder material of the metal material or the ceramic material may be coated with, for example, a thermoplastic resin shown in the above-described example, or a thermoplastic resin other than those in the above-described example. In this case, the thermoplastic resin may be melted to exhibit flowability in the plasticizing unit 30.

Figure 8:
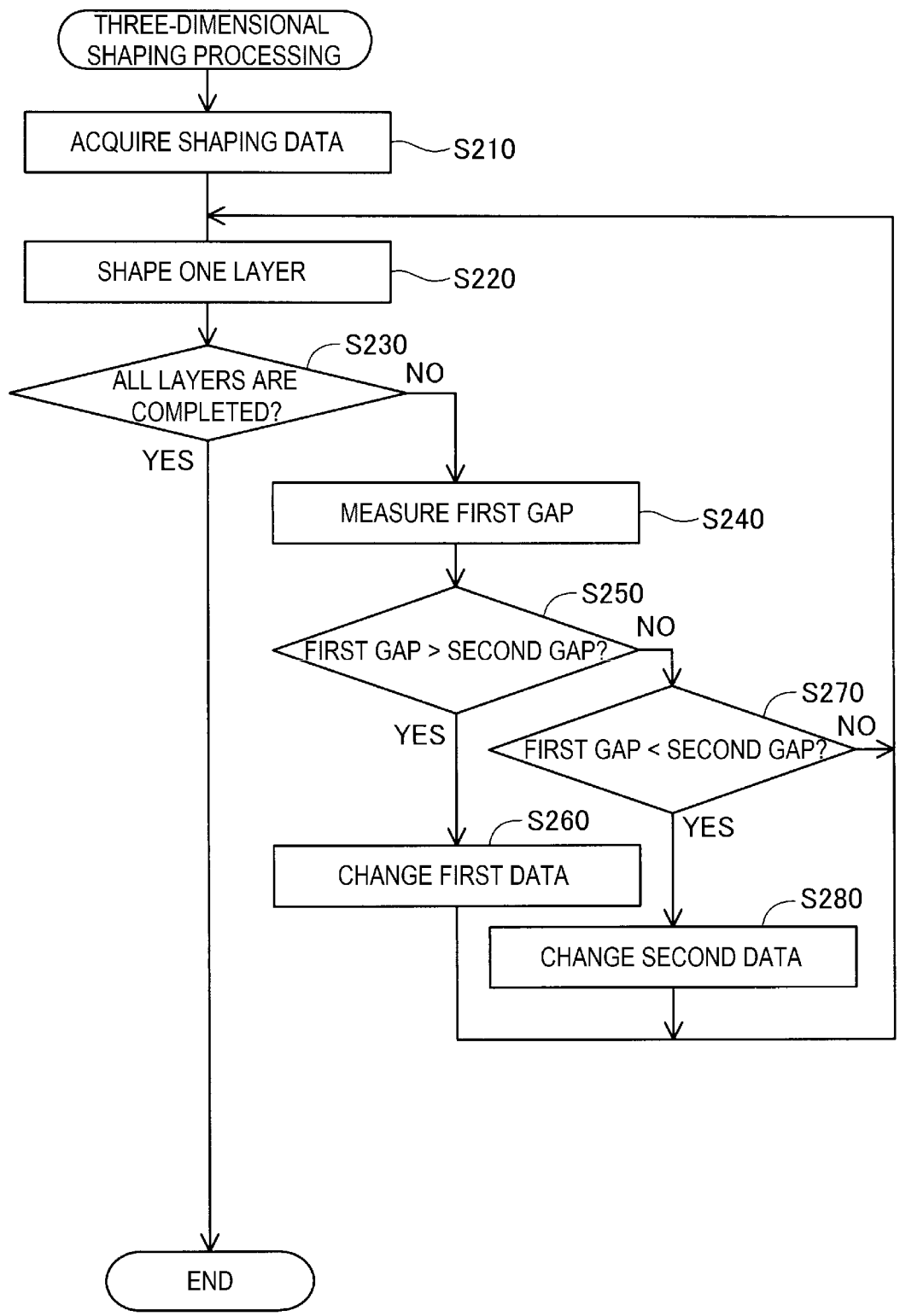
FIG. 8 is a flowchart showing an example of a three-dimensional shaped object manufacturing method according to a second embodiment.

For example, the following solvents may be added to the powder material of the metal material or the ceramic material to be charged into the material supply unit 20 as the material MR. A solvent may be one solvent or a combination of two or more solvents selected from the following solvents.
Example of Solvent Water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, isopropyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (such as tetrabutylammonium acetate); and ionic liquids such as butyl carbitol acetate In addition, for example, the following binders may be added to the powder material of the metal material or the ceramic material to be charged into the material supply unit 20 as the material MR.
Example of Binder Acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins B. Second Embodiment FIG. 8 is a flowchart showing an example of a three-dimensional shaped object OA manufacturing method according to a second embodiment. Since a configuration of the three-dimensional shaping device 100 according to the second embodiment is the same as that according to the first embodiment, a description thereof will be omitted. In the three-dimensional shaped object OA manufacturing method according to the second embodiment, points that are not particularly described are the same as those in the first embodiment.

Different from the first embodiment, the control unit 500 executes an adjustment processing by changing discharge amount data in the third step in the second embodiment. Similar to the first embodiment, the three-dimensional shaped object OA shown in FIGS. 4 and 6 is shaped in the second embodiment.

Since processing from step S210 to step S250 shown in FIG. 8 are the same as the processing from step S110 to step S150 shown in FIG. 5, a description thereof will be omitted. In the present embodiment, the adjustment processing is executed by changing the discharge amount data corresponding to the third partial path in step S250 and subsequent steps S260 to S280.

When it is determined in step S250 that the first gap Gp1 is larger than the second gap Gp2, the control unit 500 executes the adjustment processing by executing a first discharge amount data changing processing in step S260. In step S260, as the first discharge amount data changing processing, the control unit 500 adjusts a discharge amount in the third partial path by changing the discharge amount data corresponding to the third partial path, and increasing the discharge amount in the third partial path. In the example shown in FIG. 6, the control unit 500 executes the first discharge amount data changing processing and increases the discharge amount in the third partial path in step S260.

In the present embodiment, the control unit 500 changes the discharge amount data by changing at least one of an amount of the shaping material discharged per unit time from the discharge unit 200 and a moving speed of the discharge unit 200. An amount of the shaping material discharged per unit movement amount of the discharge unit 200 is changed by changing any one of the amount of the shaping material discharged per unit time from the discharge unit 200 and the moving speed of the discharge unit 200. In step S260, the control unit 500 may increase the amount of the shaping material discharged per unit time from the discharge unit 200, or reduce the moving speed of the discharge unit 200, or execute both increasing the amount of the shaping material discharged per unit time from the discharge unit 200 and reducing the moving speed of the discharge unit 200.

Since step S270 is the same as step S170 in FIG. 4, a description thereof will be omitted.

When it is determined in step S270 that the first gap Gp1 is smaller than the second gap Gp2, the control unit 500 executes the adjustment processing by executing a second discharge amount data changing processing in step S280. In step S280, as the second discharge amount data changing processing, the control unit 500 adjusts the discharge amount in the third partial path by changing the discharge amount data corresponding to the third partial path and reduces the discharge amount in the third partial path. In step S280, the control unit 500 may reduce the amount of the shaping material discharged per unit time from the discharge unit 200, or increase a moving speed of the discharge unit 200, or execute both reducing the amount of the shaping material discharged per unit time from the discharge unit 200 and increasing the moving speed of the discharge unit 200.

According to the three-dimensional shaped object manufacturing method according to the second embodiment described above, the possibility that the shaping material of an intended discharge amount can be discharged in the third partial path is increased, and the shaping accuracy of the shaped object is improved. In particular, the discharge amount in the third partial path can be adjusted by changing the discharge amount data in the present embodiment.

In the present embodiment, the discharge amount data is changed by changing at least one of the amount of the shaping material discharged per unit time from the discharge unit 200 and the moving speed of the discharge unit 200. Therefore, the discharge amount in the third partial path is adjusted by changing the amount of the shaping material discharged per unit time from the discharge unit 200 or the moving speed of the discharge unit 200.

C. Third Embodiment

Figure 9:
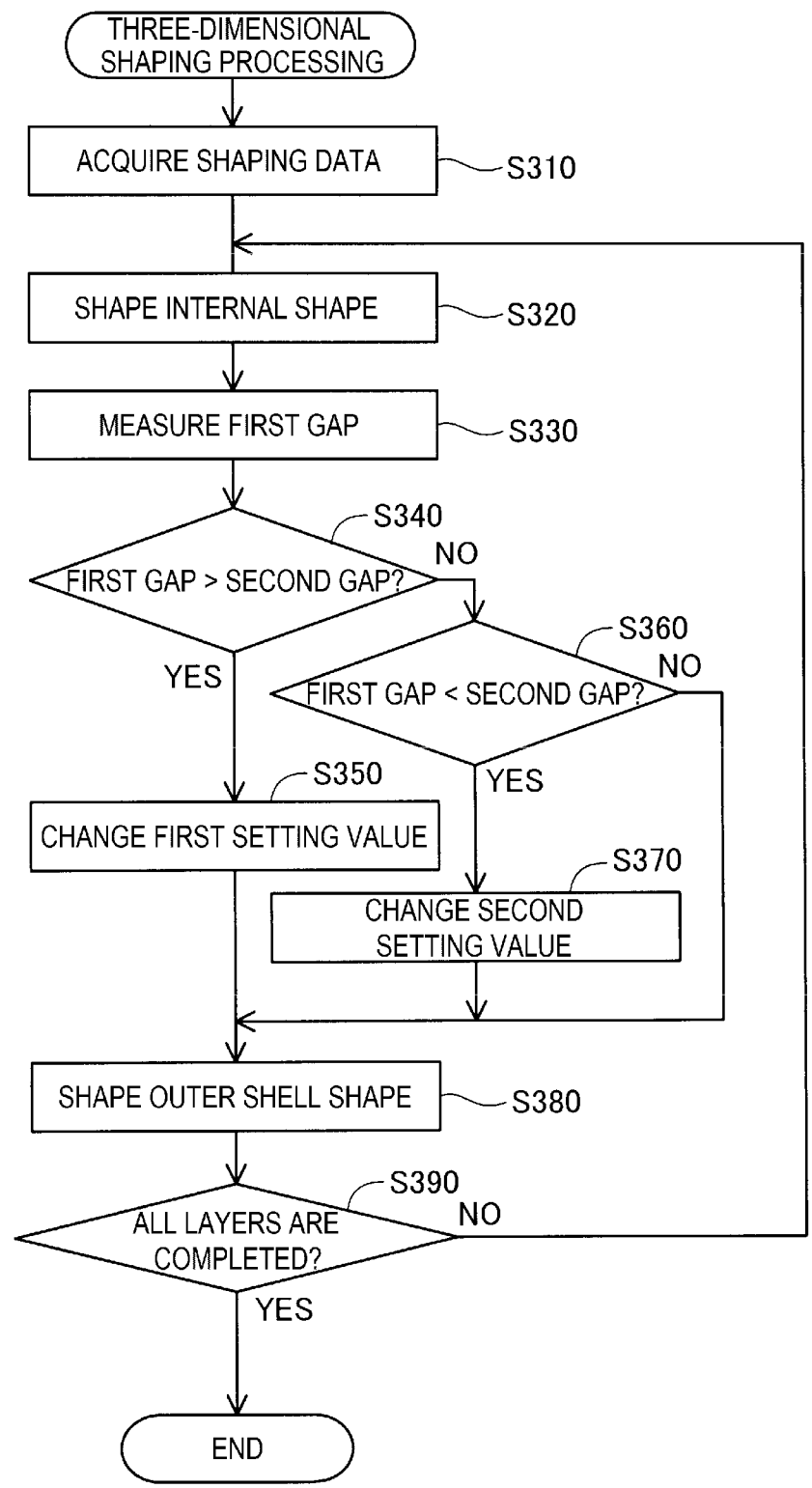
FIG. 9 is a flowchart showing an example of a three-dimensional shaped object manufacturing method according to a third embodiment.

FIG. 9 is a flowchart showing an example of a three-dimensional shaped object OAc manufacturing method according to a third embodiment. Since a configuration of the three-dimensional shaping device 100 according to the third embodiment is the same as that according to the first embodiment, a description thereof will be omitted. In the three-dimensional shaped object OAc manufacturing method according to the third embodiment, points that are not particularly described are the same as those in the first embodiment.

Figure 10:
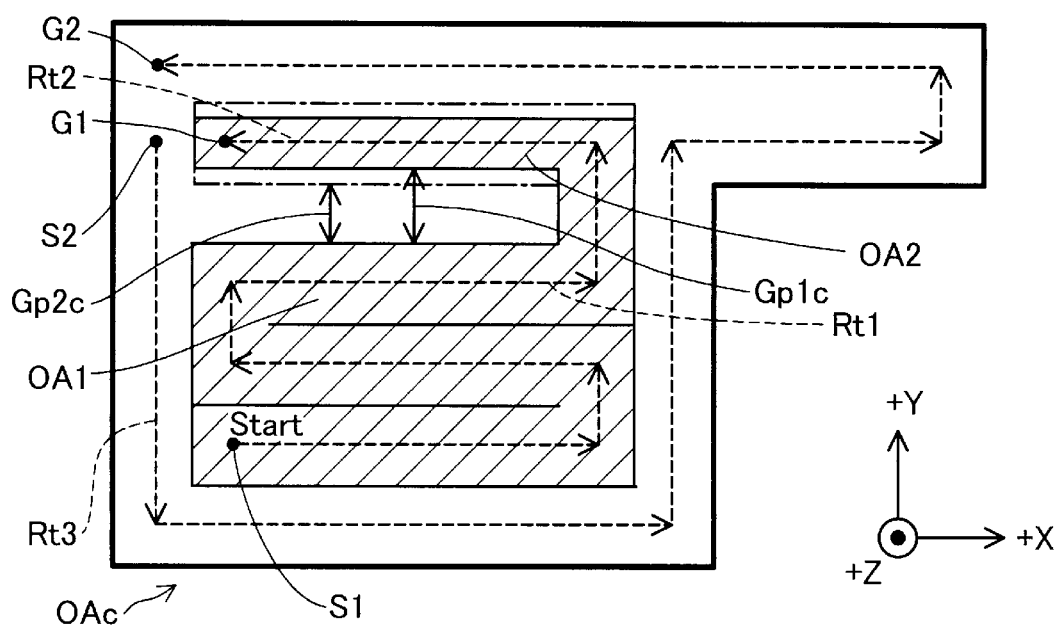
FIG. 10 is a diagram showing an example of a planar shape of one layer of a three-dimensional shaped object manufactured according to the third embodiment.

FIG. 10 is a diagram showing an example of a planar shape of one layer of a three-dimensional shaped object OAc manufactured according to the third embodiment. FIG. 10 shows a state in which an internal shape is completed in one layer of the three-dimensional shaped object OAc as viewed from the +Z direction. In FIG. 10, each path for shaping one layer is indicated by a broken line. In FIG. 10, the shaping material discharged along each path is hatched. The internal shape refers to a portion inside an outer shell shape of the three-dimensional shaped object OAc. The outer shell shape refers to a portion in the three-dimensional shaped object Oac that constitutes an outer shell of the three-dimensional shaped object OAc. The outer shell shape is a portion that affects an appearance of the three-dimensional shaped object OAc. Specifically, the internal shape is shaped as a portion that cannot be visually recognized from the outside by being surrounded by the shaping material discharged according to a path for shaping the outer shell shape of the three-dimensional shaped object OAc or being surrounded by other layers.

In the present embodiment, a first partial shaped object OA1c and a second partial shaped object OA2c are shaped as the internal shape of the three-dimensional shaped object OAc. On the other hand, the third partial shaped object is shaped as the outer shell shape of the three-dimensional shaped object OAc.

Since step S310 shown in FIG. 9 is the same as step S110 shown in FIG. 5, a description thereof will be omitted.

In step S320, the control unit 500 shapes the internal shape. In the present embodiment, as shown in FIG. 10, the control unit 500 shapes the internal shape by moving the discharge unit 200 toward a point G1 with a point S1 as a start point. As described above, the internal shape of the three-dimensional shaped object OAc includes the first partial shaped object OA1c and the second partial shaped object OA2c. In the example shown in FIG. 10, the control unit 500 shapes the outer shell shape of the three-dimensional shaped object OAc by moving the discharge unit 200 toward a point G2 with a point S2 as a start point. Shaping data for shaping the outer shell shape of the three-dimensional shaped object OAc includes a third partial path Rt3.

Since step S330 is the same as step S140, step S340 is the same as step S150, step S350 is the same as step S160, step S360 is the same as step S170, and step S370 is the same as step S180, descriptions will be omitted. In the example shown in FIG. 10, the control unit 500 determines that a first gap Gp1c is larger than a second gap Gp2c in step S340. Thereafter, as the adjustment processing, the control unit 500 executes the first setting value changing processing and increases the discharge amount in the third partial path Rt3 in step S350.

In step S380, the control unit 500 shapes the outer shell shape. At this time, the third partial shaped object is shaped as the outer shell shape as described above. In the example shown in FIG. 10, in step S380, the discharge amount in the third partial path Rt3 is increased compared with a case in which the adjustment processing is not executed.

According to the three-dimensional shaped object OAc manufacturing method of the third embodiment described above, the possibility that the shaping material of an intended discharge amount can be discharged in the third partial path Rt3 is increased, and the shaping accuracy of the three-dimensional shaped object OAc is improved. In particular, the discharge amount in the third partial path Rt3 is adjusted based on a gap between the first partial shaped object OA1c and the second partial shaped object OA2c that are shaped as the internal shape, and the third partial shaped object is shaped as the outer shell shape of the three-dimensional shaped object OAc in the present embodiment. Therefore, the shaping accuracy of the outer shell shape of the three-dimensional shaped object is further improved.

As in the third embodiment, when the first partial shaped object OA1c and the second partial shaped object OA2c are shaped as the internal shape of the three-dimensional shaped object OAc and the third partial shaped object is shaped as the outer shell shape of the three-dimensional shaped object OAc, the first partial shaped object OA1c and the second partial shaped object OA2c, and the third partial shaped object may not be included in the same layer. Therefore, similar to the first embodiment, the third partial path Rt3 may be, for example, a path for shaping a layer subsequent to a layer shaped according to the first partial path Rt1 or the second partial path Rt2. In this case, for example, after an outer shape of a certain layer is shaped, a portion including the first partial shaped object OA1c and the second partial shaped object OA2c may be shaped as an internal shape of the layer, and then the adjustment processing may be executed and the third partial shaped object may be shaped as an outer shell shape of a subsequent layer. In this case, the shaping accuracy of an outer shell shape of a three-dimensional shaped object shaped as a layer subsequent to a layer including the first partial shaped object OA1c and the second partial shaped object OA2c is further improved.

D. Fourth Embodiment

Figure 11:
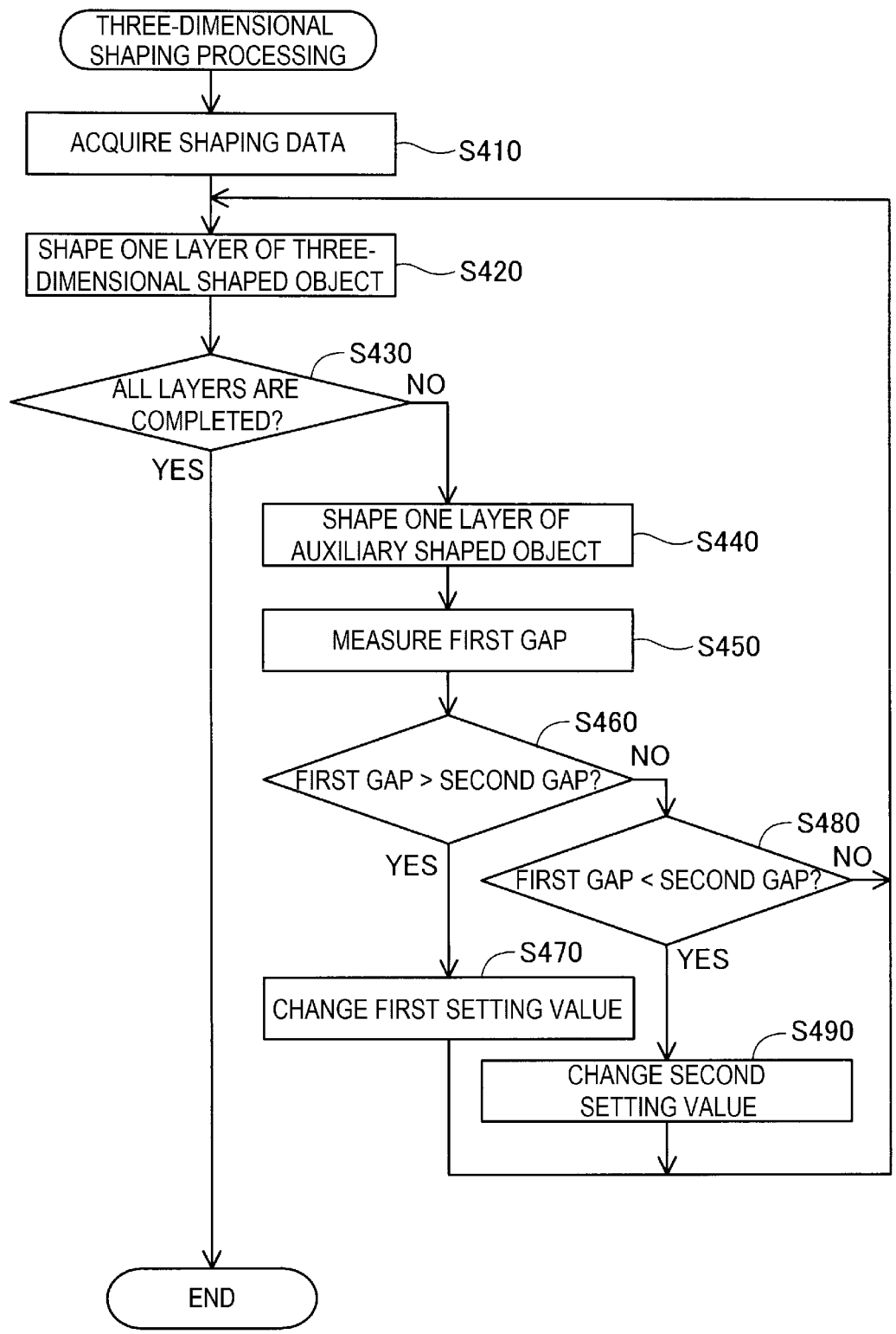
FIG. 11 is a flowchart showing an example of a three-dimensional shaped object manufacturing method according to a fourth embodiment.
Figure 12:
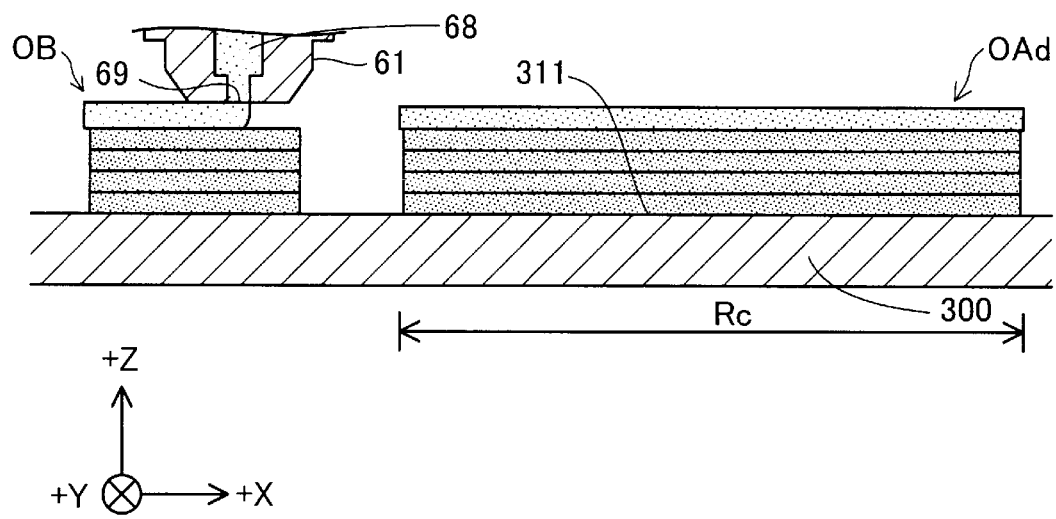
FIG. 12 is a diagram showing a state of shaping a three-dimensional shaped object and an auxiliary shaped object.

FIG. 11 is a flowchart showing an example of a three-dimensional shaped object OAd manufacturing method according to a fourth embodiment. FIG. 12 is a diagram showing a state of shaping a three-dimensional shaped object OAd and an auxiliary shaped object OB by stacking the shaping material according to the fourth embodiment. Since a configuration of the three-dimensional shaping device 100 according to the fourth embodiment is the same as that according to the first embodiment, a description thereof will be omitted. In the three-dimensional shaped object OAd manufacturing method according to the fourth embodiment, points that are not particularly described are the same as those in the first embodiment.

In the fourth embodiment, the control unit 500 shapes the three-dimensional shaped object OAd and the auxiliary shaped object OB as shown in FIG. 12 in a three-dimensional shaping processing. The control unit 500 shapes the three-dimensional shaped object OAd in a shaping region Rc on the stage 300, and shapes the auxiliary shaped object OB in a region different from the shaping region Rc. The shaping region refers to a region on the stage 300 where the three-dimensional shaped object OAd is shaped. FIG. 12 shows a state in which a fifth layer of the three-dimensional shaped object OAd is completed and a fifth layer of the auxiliary shaped object OB is in the middle of being shaped.

As shown in FIG. 12, the auxiliary shaped object OB is shaped in a region different from the shaping region Rc on the stage 300 in the present embodiment. In other embodiments, the auxiliary shaped object OB may be shaped in a region different from the stage 300 as a region different from the shaping region Rc. For example, when the three-dimensional shaping device 100 includes another stage different from the stage 300, the auxiliary shaped object OB may be shaped on the stage.

Figure 13:
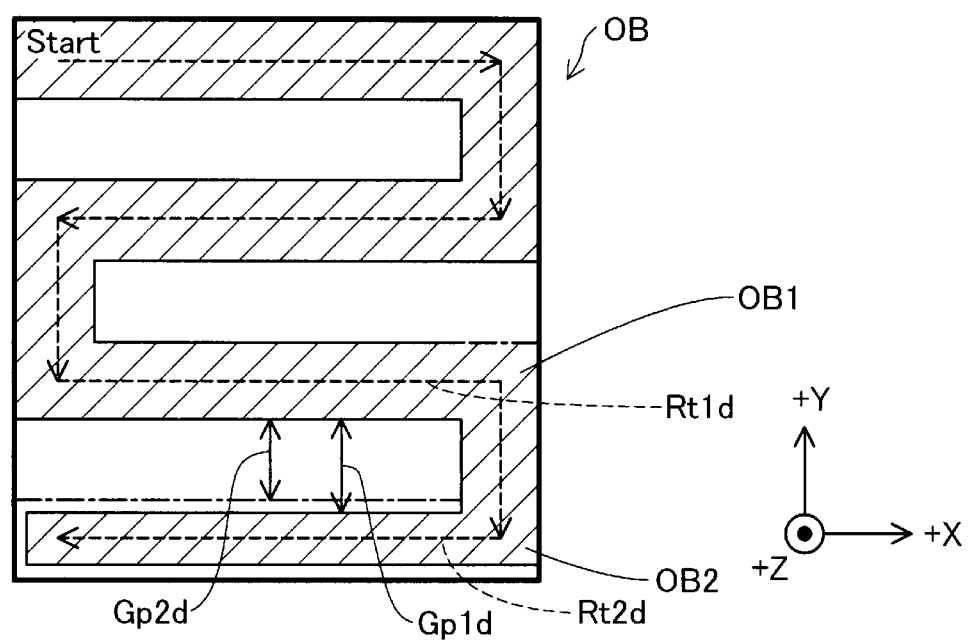
FIG. 13 is a diagram showing an example of a planar shape of one layer of the auxiliary shaped object manufactured according to the fourth embodiment.

FIG. 13 is a diagram showing an example of a planar shape of one layer of the auxiliary shaped object OB manufactured according to the fourth embodiment. FIG. 13 shows a state of one layer of the completed auxiliary shaped object OB as viewed in the +Z direction. In FIG. 13, each path for shaping a layer of the auxiliary shaped object OB is indicated by a broken line. In FIG. 13, the shaping material discharged along each path is hatched. As shown in FIG. 13, the auxiliary shaped object OB includes a first partial shaped object OB1 and a second partial shaped object OB2. Therefore, the first step is executed when the auxiliary shaped object OB is shaped. The first partial shaped object OB1 and the second partial shaped object OB2 are shaped in a region different from the shaping region Rc.

Since step S410 shown in FIG. 11 is the same as step S110 shown in FIG. 5, a description thereof will be omitted.

In step S420, the control unit 500 discharges the shaping material from the discharge unit 200, and shapes one layer of the three-dimensional shaped object OAd in the shaping region Rc. Next, in step S430, the control unit 500 determines whether all layers of the three-dimensional shaped object OAd are completed. When it is determined in step S430 that not all layers of the three-dimensional shaped object OAd are completed, the control unit 500 shapes one layer of the auxiliary shaped object OB in step S440. Therefore, in step S420, a layer that is a part of the three-dimensional shaped object OAd is shaped before the first step. When it is determined in step S430 that all layers of the three-dimensional shaped object OAd are completed, the control unit 500 ends the manufacture of the three-dimensional shaped object OAd.

In step S440, the control unit 500 shapes one layer of the auxiliary shaped object OB during at least a part of a period up to when the layer shaped in step S420 is solidified. The term "solidified" refers to that the shaping material discharged from the discharge unit 200 loses flowability. In the present embodiment, the shaping material loses plasticity and is solidified by being cooled.

In the example shown in FIG. 12, the control unit 500 shapes a fifth layer of the auxiliary shaped object OB when a fifth layer of the three-dimensional shaped object OAd is being solidified. Accordingly, for example, when the control unit 500 stacks a subsequent sixth layer on the fifth layer of the three-dimensional shaped object OAd, the sixth layer can be stacked after the fifth layer is solidified. Therefore, the shaping material is prevented from discharging on an unsolidified layer of the three-dimensional shaped object OAd, and the shaping accuracy of the three-dimensional shaped object OAd is improved. Further, since the shaping material is also discharged from the discharge unit 200 in the period up to when the three-dimensional shaped object OAd is solidified, stagnation of the shaping material in the discharge unit 200 is prevented.

In the present embodiment, the auxiliary shaped object OB is formed into a substantially quadrangular columnar shape having a height substantially equal to the three-dimensional shaped object OAd in shaping. The auxiliary shaped object OB formed in a substantially columnar shape by stacking the shaping material may also be referred to as a prime pillar. The auxiliary shaped object OB may have other shapes. For example, the auxiliary shaped object OB may be a substantially cylindrical prime pillar or may not have a substantially columnar shape.

In step S450, the control unit 500 measures a gap that is shaped as a part of the auxiliary shaped object OB between the first partial shaped object OB1 and the second partial shaped object OB2.

Since step S460 is the same as step S150, step S470 is the same as step S160, step S480 is the same as step S170, and step S490 is the same as step S180, descriptions will be omitted. In the example shown in FIG. 13, the control unit 500 determines that a first gap Gp1d is larger than a second gap Gp2d in step S460. Thereafter, in step S470, the control unit 500 executes the adjustment processing by executing the first setting value changing processing and increases the discharge amount in the third partial path.

When it is determined in step S480 that the first gap Gp1d is not smaller than the second gap Gp2d, the control unit 500 returns the processing to step S420 and shapes a subsequent layer of the three-dimensional shaped object OAd. After step S470 is executed or after step S490 is executed, the control unit 500 also returns the processing to step S420 and shapes a subsequent layer. In step S420 to be executed again, the third partial shaped object corresponding to the third partial path is shaped in the shaping region Rc. For example, when a layer of the auxiliary shaped object OB shaped in FIG. 13 is a fifth layer, in step S420 to be executed again, the third partial shaped object is shaped as a sixth layer of the three-dimensional shaped object OAd. When the setting value changing processing is executed from step S460 to step S490, in step S420 to be executed again, the discharge unit 200 is controlled based on the changed setting value. In the example shown in FIG. 13, the discharge amount in the third partial path is increased compared with a case in which the adjustment processing is not executed.

According to the three-dimensional shaped object OAd manufacturing method of the fourth embodiment described above, the possibility that the shaping material of an intended discharge amount can be discharged in the third partial path is also increased, and the shaping accuracy of the three-dimensional shaped object OAd is also improved. In particular, the discharge amount in the third partial path is adjusted based on the gap between the first partial shaped object OB1 and the second partial shaped object OB2 that are shaped in a region different from the shaping region, and the third partial shaped object is shaped in the shaping region Rc in the present embodiment. Therefore, the shaping accuracy of the three-dimensional shaped object OAd is further improved.

In the present embodiment, a layer that is at least a part of the three-dimensional shaped object OAd is shaped in the shaping region Rc before the first step, and the first step is executed during at least a part of a period up to when the shaping material constituting the layer is solidified. Therefore, the discharge amount in the third partial path is adjusted based on the gap between the first partial shaped object OB1 and the second partial shaped object OB2 that are shaped in the region different from the shaping region Rc during the period when the shaping material constituting a layer of the three-dimensional shaped object OAd in the shaping region Rc is solidified, and the third partial shaped object is shaped in the shaping region Rc. Therefore, the shaping accuracy of the three-dimensional shaped object OAd is further improved.

E. Fifth Embodiment

Figure 14:
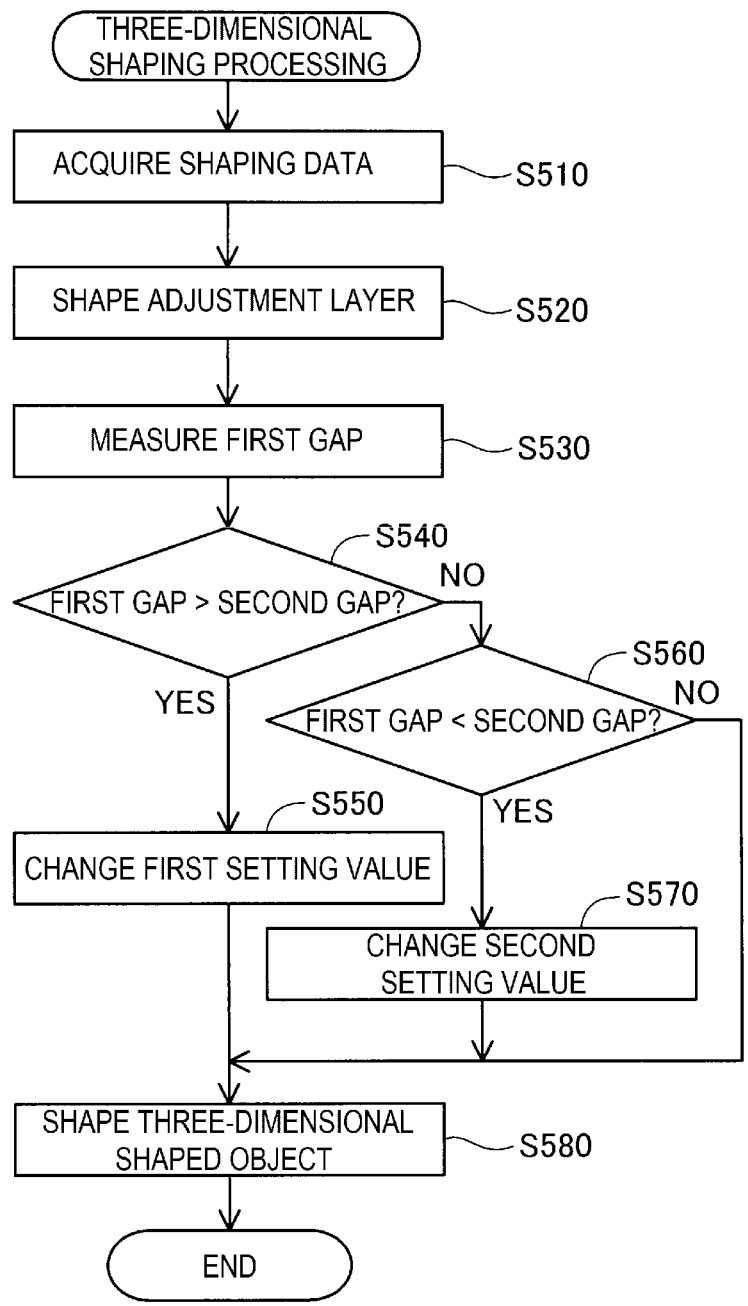
FIG. 14 is a flowchart showing an example of a three-dimensional shaped object manufacturing method according to a fifth embodiment.

FIG. 14 is a flowchart showing an example of a three-dimensional shaped object manufacturing method according to a fifth embodiment. Since a configuration of the three-dimensional shaping device 100 according to the fifth embodiment is the same as that according to the first embodiment, a description thereof will be omitted. In the three-dimensional shaped object manufacturing method according to the fifth embodiment, points that are not particularly described are the same as those in the first embodiment.

Similar to the fourth embodiment described above, the third partial shaped object is shaped in the shaping region of the stage 300 and the first partial shaped object and the second partial shaped object are shaped in the region different from the shaping region in the fifth embodiment. On the other hand, the fifth embodiment is different from the fourth embodiment in that the control unit 500 does not shape the auxiliary shaped object OB.

Since step S510 in FIG. 14 is the same as step S110 in FIG. 5, a description thereof will be omitted.

In step S520, the control unit 500 shapes an adjustment layer including the first partial shaped object and the second partial shaped object. At this time, the first step is executed. Similar to the auxiliary shaped object OB in the fourth embodiment, the adjustment layer may be shaped in a region different from the shaping region on the stage 300, or may be shaped in a region different from the stage 300.

Since step S540 is the same as step S150, step S550 is the same as step S160, step S560 is the same as step S170, and step S570 is the same as step S180, descriptions will be omitted.

After step S550 or step S570 is executed or when it is determined in step S560 that the first gap is smaller than the second gap, the control unit 500 shapes a third partial shaped object in the shaping region as a part of the three-dimensional shaped object in step S580.

According to the three-dimensional shaped object manufacturing method of the fifth embodiment described above, the possibility that the shaping material of an intended discharge amount can be discharged in the third partial path is also increased, and the shaping accuracy of the three-dimensional shaped object is also improved. In particular, the discharge amount in the third partial path is adjusted based on a gap between the first partial shaped object and the second partial shaped object that are shaped in a region different from the shaping region, and the third partial shaped object is shaped in the shaping region Rc in the present embodiment. Therefore, the shaping accuracy of the three-dimensional shaped object is further improved.

F. Sixth Embodiment

Figure 15:
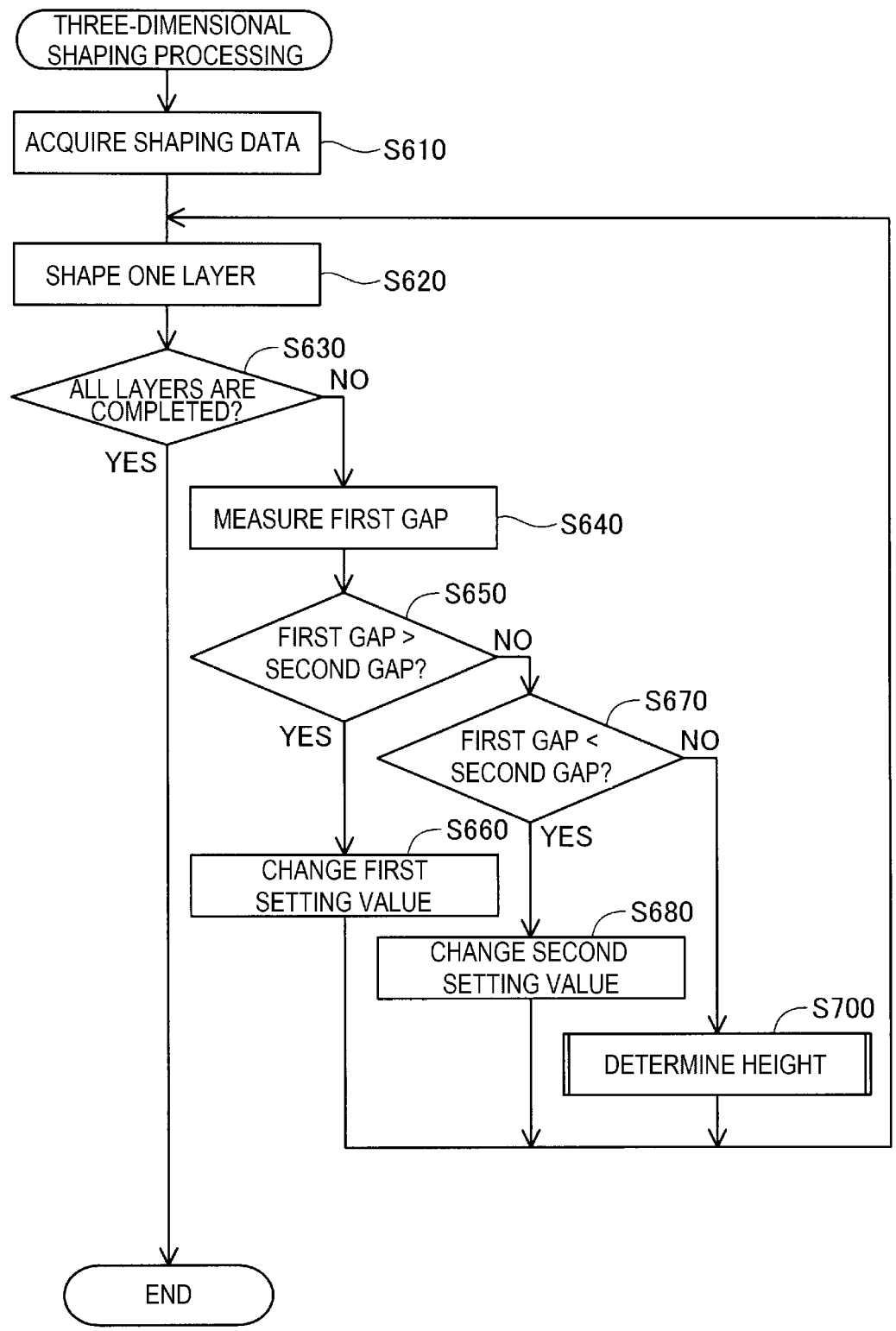
FIG. 15 is a flowchart showing an example of a three-dimensional shaped object manufacturing method according to a sixth embodiment.
Figure 16:
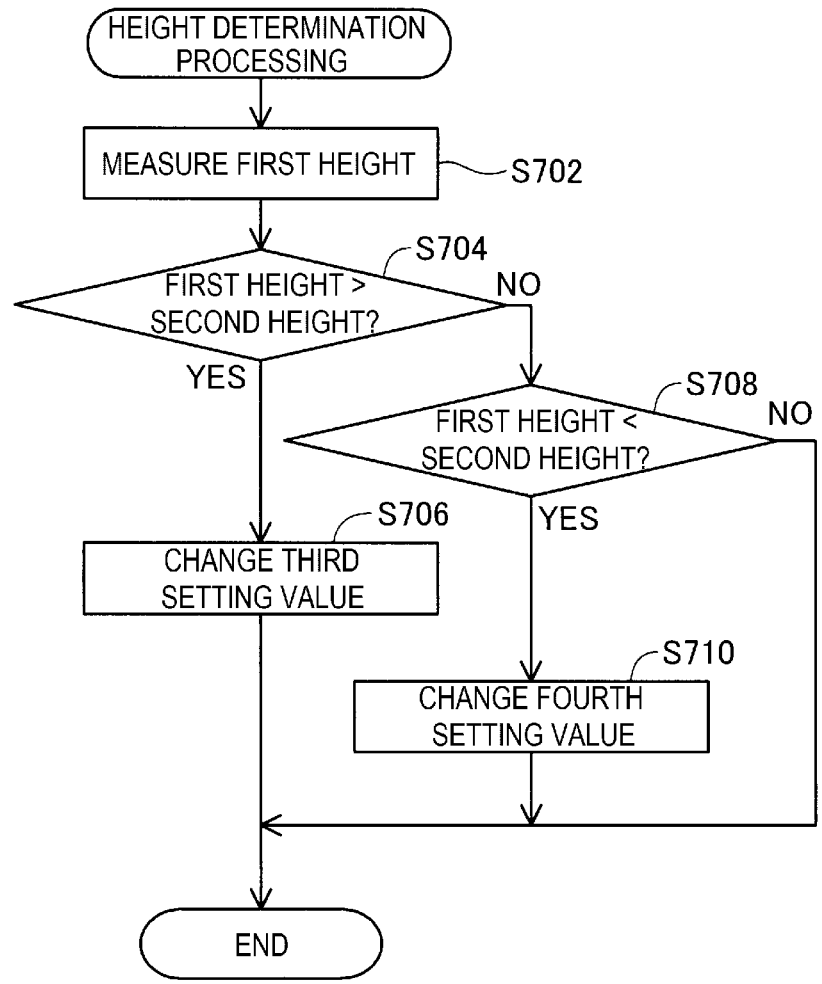
FIG. 16 is a flowchart showing an example of a height determination step.
Figure 17:
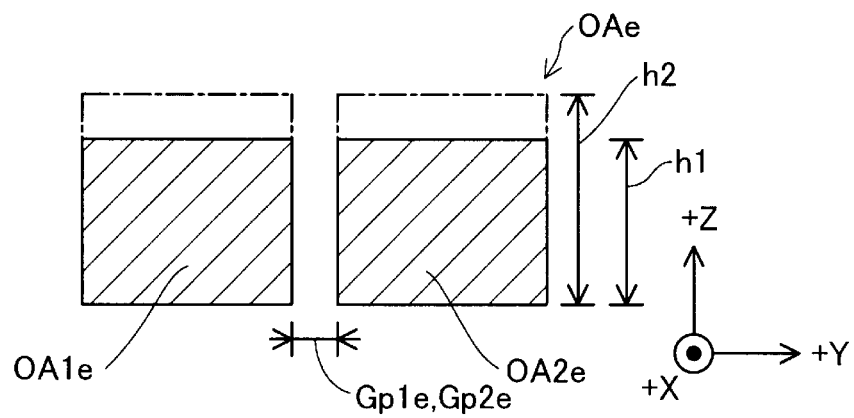
FIG. 17 is a diagram showing an example of a cross-sectional shape of a part of a three-dimensional shaped object according to the sixth embodiment.

FIG. 15 is a flowchart showing an example of a three-dimensional shaped object OAe manufacturing method according to a sixth embodiment. FIG. 16 is a flowchart showing an example of a height determination step included in a shaping processing according to the sixth embodiment. FIG. 17 is a diagram showing an example of a cross-sectional shape of a part of a three-dimensional shaped object OAe according to the sixth embodiment. Since a configuration of the three-dimensional shaping device 100 according to the sixth embodiment is the same as that according to the first embodiment, a description thereof will be omitted. In the three-dimensional shaped object OAe manufacturing method according to the sixth embodiment, points that are not particularly described are the same as those in the first embodiment. The three-dimensional shaped object OAe manufacturing method according to the sixth embodiment is different from the first embodiment in that a height determination processing to be described later is executed in the third step.

Since steps S610 to S680 shown in FIG. 15 are the same as steps S110 to S180 shown in FIG. 5, descriptions thereof will be omitted.

When it is determined in step S670 that a first gap Gp1$e$ shown in FIG. 17 is not smaller than a second gap Gp2$e$, the control unit 500 executes, in step S700, a height determination step as the third step. Step S670 is executed when it is determined in step S650 that the first gap Gp1$e$ is not larger than the second gap Gp2$e$. Therefore, step S700 is executed when the first gap Gp1$e$ is equal to the second gap. In the example shown in FIG. 17, the first gap Gp1$e$ is equal to the second gap Gp2$e$.

In the height determination step in step S700 shown in FIG. 15, a height determination processing shown in FIG. 16 is executed. In the height determination processing shown in FIG. 16, first, the control unit 500 controls the measurement unit 80 to measure a first height h1 shown in FIG. 17 in step S702. The first height h1 indicates a height of at least one of a first partial shaped object OA1$e$ and a second partial shaped object OA2e. A height of a shaped object indicates a dimension of the first partial shaped object OA1e or the second partial shaped object OA2e in a stacking direction of layers of the three-dimensional shaped object OAe. In the present embodiment, a height of the second partial shaped object OA2e is measured as the first height h1.

Similar to the first embodiment, the measurement unit 80 according to the present embodiment includes a laser oscillating unit and a laser light receiving unit. In step S702, the measurement unit 80 emits a laser toward the first partial shaped object OA1e or the second partial shaped object OA2e and measures a height of the first partial shaped object OA1e or the second partial shaped object OA2e based on time up to when the emitted laser is received, and measures the first height by subtracting a height of a layer shaped previous to a layer including the first partial shaped object OA1e and the second partial shaped object OA2e from the measured height. The measurement unit 80 can also measure a height of a previously shaped layer based on time up to when a laser emitted to the previously shaped layer is received.

Relative to the first height h1, a height that is determined based on shaping data and corresponds to the first height h1 is referred to as a second height h2. The second height h2 is determined by, for example, calculating a virtual shape of the first partial shaped object OA1e or a virtual shape of the second partial shaped object OA2e based on a discharge amount in the first partial path Rt1 or the second partial path Rt2.

In step S704, the control unit 500 determines whether the first height h1 is larger than the second height h2.

When it is determined in step S704 that the first height h1 is larger than the second height h2, the control unit 500 executes a third setting value changing processing in step S706. Similar to step S680 shown in FIG. 15, the control unit 500 changes a setting value related to discharging of the discharge unit 200 as the third setting value changing processing in step S706 in the present embodiment. That is, in step S706, the control unit 500 adjusts the discharge amount in the third partial path by changing the setting value, and reduces the discharge amount in the third partial path.

When it is determined in step S704 that the first height h1 is not larger than the second height h2, the control unit 500 determines whether the first height h1 is smaller than the second height h2 in step S708. In the example shown in FIG. 17, the control unit 500 determines that the first height h1 is smaller than the second height h2 in step S708.

When it is determined in step S708 that the first height h1 is smaller than the second height h2, the control unit 500 executes a fourth setting value changing processing in step S710. Similar to step S660 shown in FIG. 15, the control unit 500 changes a setting value as the fourth setting value changing processing in step S710. That is, in step S710, the control unit 500 adjusts the discharge amount in the third partial path by changing the setting value, and increases the discharge amount in the third partial path. In the example shown in FIG. 17, the control unit 500 executes a fourth setting value change and increases the discharge amount in the third partial path in step S710.

Step S708 is executed when it is determined that the first height h1 is not larger than the second height h2. Therefore, when it is determined in step S708 that the first height h1 is not smaller than the second height h2, the first gap height h1 is equal to the second height h2.

After the height determination step in step S700 shown in FIG. 15 is executed, similar to a case in which step S660 is executed or step S680 is executed, the control unit 500 returns the processing to step S620 to shape a subsequent layer. In step S620 to be executed again, a third partial shaped object corresponding to the third partial path is shaped. When the setting value is changed in the height determination step in step S700, the discharge unit 200 is controlled based on the changed setting value in step S620 to be executed again. In the example shown in FIG. 17, the discharge amount in the third partial path is increased compared with a case in which the setting value is not changed in the height determination process.

According to the three-dimensional shaped object OAe manufacturing method of the sixth embodiment described above, the possibility that the shaping material of an intended discharge amount can be discharged in the third partial path is also increased, and the shaping accuracy of the three-dimensional shaped object OAe is also improved. In particular, the discharge amount in the third partial path is adjusted based on not only the gap between the first partial shaped object OA1e and the second partial shaped object OA2e, but also the height of the first partial shaped object OA1e or the second partial shaped object OA2e in the present embodiment. Therefore, the possibility that the shaping material of an intended discharge amount can be discharged in the third partial path is further increased, and the shaping accuracy of the three-dimensional shaped object OAe is further improved.

G. Other Embodiments (G-1) In the embodiments described above, as the adjustment processing, the control unit 500 increases the discharge amount in the third partial path when the first gap is larger than the second gap and reduces the discharge amount in the third partial path when the first gap is smaller than the second gap in the third step. On the other hand, the control unit 500 may execute only one of increasing the discharge amount and reducing the discharge amount as the adjustment processing.

(G-2) In the embodiments described above, when the discharge amount data is to be changed, the control unit 500 changes at least one of an amount of the shaping material discharged per unit time from the discharge unit 200 and a moving speed at which the discharge unit 200 moves relative to the stage 300. On the other hand, for example, when the discharge amount data is data that defines a discharge amount in each path, the control unit 500 may change the discharge amount data by changing the discharge amount included in the discharge amount data.

(G-3) In the embodiments described above, the control unit 500 changes a value for controlling at least one of a rotation speed of the flat screw 40, a temperature of the plasticizing unit 30, and a temperature of the nozzle 61 as the setting value. On the other hand, the control unit 500 may change another value as the setting value. For example, when the discharge unit 200 includes the discharge amount adjustment mechanism 70 as in the embodiments described above, the control unit 500 may change a value for controlling an opening degree of the discharge amount adjustment mechanism 70. The control unit 500 may change, for example, a value for controlling the rotation speed of the flat screw 40, the temperature of the plasticizing unit 30, or the temperature of the nozzle 61. In this case, the control unit 500 may change an output of the drive motor 32, an output of the heater 58, or an output of the nozzle heater 75 as the change of the setting value.

(G-4) In the embodiments described above, the control unit 500 measures, as a first gap, a gap that is between the first partial shaped object and the second partial shaped object and is measured by controlling the measurement unit 80 in the second step. On the other hand, for example, the control unit 500 may measure the first gap by statistically processing a plurality of gaps measured by the measurement unit 80. For example, the control unit 500 may shape a plurality of first partial shaped objects and second partial shaped objects in the first step and set, as the first gap, a sum of gaps that are between the plurality of first partial shaped objects and second partial shaped objects and are measured by the measurement unit 80 in the second step. In this case, for example, the control unit 500 may set a sum of a plurality of gaps determined based on the shaping data as a second gap, and may compare the first gap with the second gap in the third step.

(G-5) In the embodiments described above, the control unit 500 executes the second step every time one layer of the three-dimensional shaped object is shaped, and measures the first gap. On the other hand, for example, the control unit 500 may execute the second step every time two or three layers of the three-dimensional shaped object are shaped, or may execute the second step when one layer of the three-dimensional shaped object is in the middle of being shaped.

(G-6) In the third to the sixth embodiments described above, the control unit 500 executes the adjustment processing by changing the setting value related to discharging of the shaping material in the discharge unit 200 in the third step. On the other hand, similar to the second embodiment, the control unit 500 may execute the adjustment processing by changing the discharge amount data corresponding to the third partial path in the third to sixth embodiments.

(G-7) In the embodiments described above, the measurement unit 80 includes a laser oscillating unit and a laser light receiving unit, and measures a gap between shaping materials or a height of the shaping materials using a laser. On the other hand, the measurement unit 80 may not be a measurement device including a laser oscillating unit and a laser light receiving unit. For example, a function of the measurement unit 80 may be realized by a camera and the control unit 500. In this case, the control unit 500 can measure the gap or the height by analyzing image data acquired by a CCD camera, a CMOS camera, or the like. The control unit 500 may improve measurement accuracy of the gap or the height by using, for example, a plurality of pieces of image data acquired by the camera. In addition, the function of the measurement unit 80 may be realized by the control unit 500 and a temperature sensor including an infrared light receiving unit. In this case, the control unit 500 can measure the gap or the height by analyzing a temperature distribution measured by the temperature sensor. The measurement device that measures a gap and the measurement device that measures a height of the first partial shaped object or the second partial shaped object may be provided separately from each other.

H. Other Aspects

The present disclosure is not limited to the embodiments described above, and can be implemented in various aspects without departing from the scope of the present disclosure. For example, the present disclosure can be implemented in the following aspects. In order to solve a part of or all of problems of the present disclosure, or to achieve a part of or all of effects of the present disclosure, technical features in the above-described embodiments corresponding to technical features in the following aspects can be replaced or combined as appropriate. Technical features can be deleted as appropriate unless the technique features are described as essential in the present specification.

(1) According to a first aspect of the present disclosure, there is provided a three-dimensional shaped object manufacturing method for shaping a three-dimensional shaped object by discharging a shaping material from a discharge unit toward a stage. The three-dimensional shaped object manufacturing method for shaping the three-dimensional shaped object by discharging the shaping material from the discharge unit toward the stage includes a first step of shaping a first partial shaped object corresponding to a first partial path and a second partial shaped object corresponding to a second partial path in accordance with shaping data including path data and discharge amount data, the path data including a plurality of paths along which the discharge unit moves while discharging the shaping material and including the first partial path and the second partial path that are adjacent paths among the plurality of paths, the discharge amount data indicating a discharge amount of the shaping material in each of the paths; a second step of measuring a first gap indicating a gap between the first partial shaped object and the second partial shaped object; and a third step of executing an adjustment processing of adjusting, based on a difference between the first gap and a second gap determined based on the shaping data and corresponding to the first gap, a discharge amount in a third partial path which is one of the plurality of paths and along which the discharge unit moves after the first partial path and the second partial path.

According to this aspect, the possibility to discharge the shaping material of an intended discharge amount in the third partial path is increased, and the shaping accuracy of the three-dimensional shaped object is improved.

(2) In the three-dimensional shaped object manufacturing method according to the aspect described above, in the third step, as the adjustment processing, the discharge amount in the third partial path may be increased when the first gap is larger than the second gap. According to this aspect, the possibility that a discharge amount of the actually discharged shaping material in the third partial path is smaller than an intended discharge amount is reduced. Therefore, the possibility to discharge the shaping material of an intended discharge amount in the third partial path is increased, and the shaping accuracy of the three-dimensional shaped object is improved.

(3) In the three-dimensional shaped object manufacturing method according to the aspect described above, in the third step, as the adjustment processing, the discharge amount in the third partial path may be reduced when the first gap is smaller than the second gap. According to this aspect, the possibility that a discharge amount of the actually discharged shaping material in the third partial path is larger than an intended discharge amount is reduced. Therefore, the possibility to discharge the shaping material of an intended discharge amount in the third partial path is further increased, and the shaping accuracy of the three-dimensional shaped object is further improved.

(4) In the three-dimensional shaped object manufacturing method according to the aspect described above, in the third step, a first height of at least one of the first partial shaped object and the second partial shaped object may be measured when the first gap is equal to the second gap, the discharge amount in the third partial path may be reduced when the first height is larger than a second height determined based on the shaping data and corresponding to the first height, and the discharge amount in the third partial path may be increased when the first height is smaller than the second height. According to this aspect, the discharge amount in the third partial path is adjusted based on not only a gap between the first partial shaped object and the second partial shaped object but also a height of the first partial shaped object or the second partial shaped object. Therefore, the possibility that the shaping material of an intended discharge amount can be discharged in the third partial path is further increased, and the shaping accuracy of the three-dimensional shaped object is further improved.

(5) In the three-dimensional shaped object manufacturing method according to the aspect described above, in the third step, the adjustment processing may be executed by changing the discharge amount data corresponding to the third partial path. According to this aspect, the discharge amount in the third partial path can be adjusted by changing the discharge amount data.

(6) In the three-dimensional shaped object manufacturing method according to the aspect described above, in the third step, the discharge amount data corresponding to the third partial path may be changed by changing at least one of an amount of the shaping material discharged per unit time from the discharge unit and a moving speed at which the discharge unit moves relative to the stage. According to this aspect, the discharge amount in the third partial path can be adjusted by changing the amount of the shaping material discharged per unit time from the discharge unit or the moving speed of the discharge unit as a change of the discharge amount data.

(7) In the three-dimensional shaped object manufacturing method according to the aspect described above, in the third step, the adjustment processing may be executed by changing a setting value related to discharging of the shaping material in the discharge unit. According to this aspect, by changing the setting value, flowability of the shaping material in the discharge unit can be adjusted and the discharge amount in the third partial path can be adjusted.

(8) In the three-dimensional shaped object manufacturing method according to the aspect described above, the discharge unit may include a plasticizing unit configured to plasticize a material to generate the shaping material and a nozzle configured to discharge the shaping material, the plasticizing unit may include a flat screw having a groove forming surface on which a groove is formed, and as the setting value, at least a value of a rotation speed of the flat screw, a temperature of the plasticizing unit, and a temperature of the nozzle may be changed in the third step. According to this aspect, when the discharge unit includes the nozzle and the plasticizing unit having the flat screw, by a simple control, the flowability of the shaping material in the discharge unit can be adjusted and the discharge amount in the third partial path can be adjusted.

(9) In the three-dimensional shaped object manufacturing method according to the aspect described above, the third partial shaped object corresponding to the third partial path may be shaped as an outer shell shape, and the first partial shaped object and the second partial shaped object may be shaped as an internal shape that is a portion inside the outer shell shape. According to this aspect, the discharge amount in the third partial path is adjusted based on the gap between the first partial shaped object and the second partial shaped object that are shaped as the internal shape, and the third partial shaped object is shaped as the outer shell shape of the three-dimensional shaped object. Therefore, the shaping accuracy of the outer shell shape of the three-dimensional shaped object is further improved.

(10) In the three-dimensional shaped object manufacturing method according to the aspect described above, the third partial shaped object may be shaped in a shaping region on the stage, and the first partial shaped object and the second partial shaped object may be shaped in a region different from the shaping region. According to this aspect, the discharge amount in the third partial path is adjusted based on the gap between the first partial shaped object and the second partial shaped object that are shaped in the region different from the shaping region, and the third partial shaped object is shaped in the shaping region. Therefore, the shaping accuracy of the three-dimensional shaped object is further improved.

(11) In the three-dimensional shaped object manufacturing method according to the aspect described above, a layer that is a part of the three-dimensional shaped object may be shaped on the shaping region by discharging the shaping material from the discharge unit before the first step, and the first step may be executed during at least apart of a period up to when the shaping material constituting the layer is solidified. According to this aspect, the discharge amount in the third partial path is adjusted based on the gap between the first partial shaped object and the second partial shaped object that are shaped in the region different from the shaping region during a period when the shaping material constituting a layer of the three-dimensional shaped object in the shaping region is solidified, and the third partial shaped object is shaped in the shaping region. Therefore, the shaping accuracy of the three-dimensional shaped object is further improved.

(12) According to a second aspect of the present disclosure, there is provided a three-dimensional shaping device. The three-dimensional shaping device includes a discharge unit configured to discharge a shaping material toward a stage, a moving mechanism configured to change a relative position between the discharge unit and the stage, a measurement unit configured to measure a gap between discharged shaping materials, and a control unit configured to control the discharge unit, the moving mechanism, and the measurement unit. The control unit is configured to shape a first partial shaped object corresponding to a first partial path and a second partial shaped object corresponding to a second partial path by controlling the discharge unit and the moving mechanism in accordance with shaping data including path data and discharge amount data, the path data including a plurality of paths along which the discharge unit moves while discharging the shaping material and including the first partial path and the second partial path that are adjacent paths among the plurality of paths, the discharge amount data indicating a discharge amount of the shaping material in each of the paths; measure a first gap indicating a gap between the first partial shaped object and the second partial shaped object by controlling the measurement unit; and execute an adjustment processing of adjusting, based on a difference between the first gap and a second gap determined based on the shaping data and corresponding to the first gap, a discharge amount in a third partial path which is one of the plurality of paths and along which the discharge unit moves after the first partial path and the second partial path.

According to this aspect, the possibility to discharge the shaping material of an intended discharge amount in the third partial path is increased, and the shaping accuracy of the three-dimensional shaped object is improved.

The present disclosure is not limited to the three-dimensional shaped object manufacturing method and the three-dimensional shaping device described above, and can be implemented in various aspects. For example, the present disclosure can be implemented in an aspect of a three-dimensional shaping device control method, a computer program for shaping a three-dimensional shaped object, a non-transitory tangible recording medium in which the computer program is recorded, and the like.

What is claimed is:

1. A three-dimensional shaped object manufacturing method for shaping a three-dimensional shaped object by discharging a shaping material from a discharge unit toward a stage, the three-dimensional shaped object manufacturing method comprising:
a first step of shaping a first partial shaped object corresponding to a first partial path and a second partial shaped object corresponding to a second partial path in accordance with shaping data including path data and discharge amount data, the path data including a plurality of paths along which the discharge unit moves while discharging the shaping material and including the first partial path and the second partial path that are adjacent paths among the plurality of paths, the discharge amount data indicating a discharge amount of the shaping material in each of the paths;
a second step of measuring a first gap indicating a gap between the first partial shaped object and the second partial shaped object; and
a third step of executing an adjustment processing of adjusting, based on a difference between the first gap and a second gap determined based on the shaping data and corresponding to the first gap, a discharge amount in a third partial path which is one of the plurality of paths and along which the discharge unit moves after the first partial path and the second partial path.

2. The three-dimensional shaped object manufacturing method according to claim 1, wherein
in the third step, as the adjustment processing, the discharge amount in the third partial path is increased when the first gap is larger than the second gap.

3. The three-dimensional shaped object manufacturing method according to claim 1, wherein
in the third step, as the adjustment processing, the discharge amount in the third partial path is reduced when the first gap is smaller than the second gap.

4. The three-dimensional shaped object manufacturing method according to claim 1, wherein
in the third step,
a first height of at least one of the first partial shaped object and the second partial shaped object is measured when the first gap is equal to the second gap,
the discharge amount in the third partial path is reduced when the first height is larger than a second height determined based on the shaping data and corresponding to the first height, and
the discharge amount in the third partial path is increased when the first height is smaller than the second height.

5. The three-dimensional shaped object manufacturing method according to claim 1, wherein
in the third step, the adjustment processing is executed by changing the discharge amount data corresponding to the third partial path.

6. The three-dimensional shaped object manufacturing method according to claim 5, wherein
in the third step, the discharge amount data corresponding to the third partial path is changed by changing at least one of an amount of the shaping material discharged per unit time from the discharge unit and a moving speed at which the discharge unit moves relative to the stage.

7. The three-dimensional shaped object manufacturing method according to claim 1, wherein
in the third step, the adjustment processing is executed by changing a setting value related to discharging of the shaping material in the discharge unit.

8. The three-dimensional shaped object manufacturing method according to claim 7, wherein
the discharge unit includes a plasticizing unit configured to plasticize a material to generate the shaping material, and a nozzle configured to discharge the shaping material,
the plasticizing unit includes a flat screw having a groove forming surface on which a groove is formed, and
in the third step, as the setting value, at least one value of a rotation speed of the flat screw, a temperature of the plasticizing unit, and a temperature of the nozzle is changed.

9. The three-dimensional shaped object manufacturing method according to claim 1, wherein
a third partial shaped object corresponding to the third partial path is shaped as an outer shell shape, and
the first partial shaped object and the second partial shaped object are shaped as an internal shape that is a portion inside the outer shell shape.

10. The three-dimensional shaped object manufacturing method according to claim 1, wherein
the third partial shaped object corresponding to the third partial path is shaped in a shaping region on the stage, and
the first partial shaped object and the second partial shaped object are shaped in a region different from the shaping region.

11. The three-dimensional shaped object manufacturing method according to claim 10, wherein
a layer that is a part of the three-dimensional shaped object is shaped on the shaping region by discharging the shaping material from the discharge unit before the first step, and
the first step is executed during at least a part of a period up to when the shaping material constituting the layer is solidified.

12. A three-dimensional shaping device comprising:
a discharge unit configured to discharge a shaping material toward a stage;
a positioner configured to change a relative position between the discharge unit and the stage;
a laser based measurement unit configured to measure a gap between discharged shaping materials; and
a processor configured to control the discharge unit, the positioner, and the laser based measurement unit, wherein the processor is configured to:
shape a first partial shaped object corresponding to a first partial path and a second partial shaped object corresponding to a second partial path by controlling the discharge unit and the positioner in accordance with shaping data including path data and discharge amount data, the path data including a plurality of paths along which the discharge unit moves while discharging the shaping material and including the first partial path and the second partial path that are adjacent paths among the plurality of paths, the discharge amount data indicating a discharge amount of the shaping material in each of the paths,
measure a first gap indicating a gap between the first partial shaped object and the second partial shaped object by controlling the laser based measurement unit, and execute an adjustment processing of adjusting, based on a difference between the first gap and a second gap determined based on the shaping data and corresponding to the first gap, a discharge amount in a third partial path which is one of the plurality of paths and along which the discharge unit moves after the first partial path and the second partial path.

\* \* \* \* \*